United States Patent
Wang et al.

(10) Patent No.: US 11,061,118 B2
(45) Date of Patent: *Jul. 13, 2021

(54) MIRROR ASSEMBLY FOR LIGHT STEERING

(71) Applicant: BEIJING VOYAGER TECHNOLOGY CO., LTD., Beijing (CN)

(72) Inventors: Youmin Wang, Berkeley, CA (US); Lingkai Kong, Palo Alto, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,547

(22) Filed: Jun. 3, 2020

(65) Prior Publication Data

US 2020/0292672 A1  Sep. 17, 2020

Related U.S. Application Data

(63) Continuation of application No. 16/702,448, filed on Dec. 3, 2019, which is a continuation-in-part of
(Continued)

(51) Int. Cl.
*G01S 7/481* (2006.01)
*G01S 17/894* (2020.01)
(Continued)

(52) U.S. Cl.
CPC .......... *G01S 7/4816* (2013.01); *G01S 17/894* (2020.01); *G02B 5/09* (2013.01); *G02B 27/30* (2013.01)

(58) Field of Classification Search
None
See application file for complete search history.

(56) References Cited

U.S. PATENT DOCUMENTS

| 5,221,933 A | 6/1993 | Chandler |
| 9,063,549 B1 | 6/2015 | Pennecot et al. |

(Continued)

FOREIGN PATENT DOCUMENTS

| CN | 106353891 A | 1/2017 |
| EP | 2597859 A1 | 5/2013 |
| WO | 2018055449 A2 | 3/2018 |

OTHER PUBLICATIONS

Nonfinal Office Action issued in related U.S. Appl. No. 16/213,992, dated Mar. 18, 2019, 16 pages.
(Continued)

*Primary Examiner* — Navid Ziaeianmehdizadeh
(74) *Attorney, Agent, or Firm* — Bayes PLLC

(57) ABSTRACT

Embodiments of the disclosure provide a Light Detection and Ranging system. The system may include a light source configured to emit a light beam, a first apparatus configured to adjust the light beam and a second apparatus configured to adjust the light beam and receive the reflected light beam from a first rotatable mirror. The first apparatus may include the first rotatable mirror configured to receive and reflect the light beam, and a first actuator configured to rotate the first rotatable mirror. The second apparatus may include a second adjustable mirror configured to receive and propagate the light beam, a second actuator configured to adjust the second adjustable mirror, and a detector configured to receive the light beam reflected by the object. The first rotatable mirror is further configured to receive and reflect the light beam reflected by the object to the detector.

23 Claims, 24 Drawing Sheets

Related U.S. Application Data application No. 16/387,500, filed on Apr. 17, 2019, which is a continuation-in-part of application No. 16/237,454, filed on Dec. 31, 2018, which is a continuation-in-part of application No. 16/213,992, filed on Dec. 7, 2018, now Pat. No. 10,422,881.

(51) Int. Cl.
*G02B 27/30* (2006.01)
*G02B 5/09* (2006.01)

(56) References Cited

U.S. PATENT DOCUMENTS

| | | | |
|---|---|---|---|
| 2002/0164123 | A1 | 11/2002 | Hamerly et al. |
| 2003/0007202 | A1 | 1/2003 | Moser et al. |
| 2003/0053156 | A1 | 3/2003 | Satoh et al. |
| 2003/0086147 | A1 | 5/2003 | Bruns |
| 2004/0202407 | A1 | 10/2004 | Hoke |
| 2004/0263937 | A1 | 12/2004 | Fujii et al. |
| 2005/0185237 | A1 | 8/2005 | Nakajima |
| 2006/0039059 | A1 | 2/2006 | Ji et al. |
| 2007/0053035 | A1* | 3/2007 | Cho .................... G02B 26/101 359/201.1 |
| 2010/0046054 | A1 | 2/2010 | Jeong et al. |
| 2011/0164783 | A1 | 7/2011 | Hays et al. |
| 2012/0281265 | A1 | 11/2012 | Zhang et al. |
| 2013/0057936 | A1 | 3/2013 | Wang et al. |
| 2013/0188043 | A1 | 7/2013 | Decoster |
| 2013/0242363 | A1 | 9/2013 | Weiss et al. |
| 2013/0301095 | A1 | 11/2013 | Zhang et al. |
| 2014/0078519 | A1 | 3/2014 | Steffey et al. |
| 2014/0151535 | A1 | 6/2014 | Mori et al. |
| 2016/0139404 | A1 | 5/2016 | Akanuma |
| 2016/0146939 | A1* | 5/2016 | Shpunt .................. G01S 7/4817 356/5.01 |
| 2016/0282468 | A1 | 9/2016 | Gruver et al. |
| 2017/0097419 | A1 | 4/2017 | Murayama et al. |
| 2017/0242104 | A1 | 8/2017 | Dussan |
| 2017/0307737 | A1 | 10/2017 | Ishikawa et al. |
| 2017/0307876 | A1 | 10/2017 | Dusssan et al. |
| 2018/0011173 | A1 | 1/2018 | Newman |
| 2018/0252816 | A1 | 9/2018 | Tanaka |
| 2018/0275249 | A1 | 9/2018 | Campbell et al. |
| 2018/0284285 | A1* | 10/2018 | Curatu ................... G01S 17/42 |
| 2018/0284286 | A1 | 10/2018 | Eichenholz et al. |
| 2018/0329037 | A1* | 11/2018 | Bozchalooi .......... G01S 17/931 |
| 2018/0329204 | A1 | 11/2018 | Smits |
| 2019/0041500 | A1 | 2/2019 | Isono |
| 2019/0056496 | A1 | 2/2019 | Sakai et al. |

OTHER PUBLICATIONS

International Search Report issued in corresponding International Application No. PCT/US2018/068226, dated Mar. 15, 2019, 3 pages.

Written Opinion of the International Searching Authority issued in corresponding International Application No. PCT/US2018/068226, dated Mar. 15, 2019, 5 pages.

International Search Report and Written Opinion in related PCT/US2018/065039, dated Mar. 15, 2019, 9 pages.

Supplementary European Search Report issued in corresponding European Application No. EP 18 91 4927, dated Nov. 5, 2021, 7 pages.

\* cited by examiner

MIRROR ASSEMBLY FOR LIGHT STEERING

CROSS-REFERENCES TO RELATED APPLICATIONS

This application is continuation of U.S. patent application Ser. No. 16/702,448, filed on Dec. 3, 2019, entitled "Mirror Assembly for Light Steering," which is continuation in part of U.S. patent application Ser. No. 16/387,500, filed on Apr. 17, 2019, entitled "Mirror Assembly for Light Steering," which is continuation in part of U.S. patent application Ser. No. 16/237,454, filed on Dec. 31, 2018, entitled "Mirror Assembly for Light Steering," which is continuation in part of U.S. patent application Ser. No. 16/213,992, filed on Dec. 7, 2018, entitled "Mirror Assembly for Light Steering," all of which are hereby incorporated by reference in their entireties.

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Light steering can be performed in both transmission and reception of light. For example, a light steering system may include a micro-mirror array to control the projection direction of light to detect/image an object. Moreover, a light steering receiver may also include a micro-mirror array to select a direction of incident light to be detected by the receiver, to avoid detecting other unwanted signals. The micro-mirror array may include an array of micro-mirror assemblies, with each micro-mirror assembly comprising a micro-mirror and an actuator. In a micro-mirror assembly, a micro-mirror can be connected to a substrate via a connection structure (e.g., a torsion bar, a spring, etc.) to form a pivot, and the micro-mirror can be rotated around the pivot by the actuator. Each micro-mirror can be rotated by a rotation angle to reflect (and steer) light from a light source towards at a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, are to be detected by the receiver.

The mirror assembly can dominate various performance metrics of the light steering system including, for example, precision, actuation power, FOV, dispersion angle, reliability, etc. It is desirable to provide a mirror assembly that can improve these performance metrics.

BRIEF SUMMARY

In one aspect, embodiments of the disclosure provide a Light Detection and Ranging system. The system may include a light source configured to emit a light beam, a first apparatus configured to adjust the light beam and a second apparatus configured to adjust the light beam and receive the reflected light beam from a first rotatable mirror. The first apparatus may include the first rotatable mirror configured to receive and reflect the light beam, and a first actuator configured to rotate the first rotatable mirror. The second apparatus may include a second adjustable mirror configured to receive and propagate the light beam, a second actuator configured to adjust the second adjustable mirror, and a detector configured to receive the light beam reflected by the object. The first rotatable mirror is further configured to receive and reflect the light beam reflected by the object to the detector.

In another aspect, embodiments of the disclosure provide a Light Detection and Ranging system. The system may include a light source configured to emit a light beam and a light adjusting aperture. The light adjusting aperture may include a motor configured to rotate the aperture in a first direction, a microelectromechanical system (MEMS) and a detector configured to receive a light beam reflected by a rotatable mirror array. The MEMS may include the rotatable mirror array rotatable in a second direction, orthogonal to the first direction, configured to receive and reflect a light beam projected by the light source and receive and reflect the light beam reflected by an object, and an actuator configured to rotate the rotatable mirror array in the second direction.

In a further aspect, embodiments of the disclosure further provide a method for adjusting a light beam in a light steering system. The method may include determining a first angle and a second angle of a light path, the light path being a projection path for an output light or an input path of an input light, the first angle being with respect to a first dimension, the second angle being with respect to a second dimension orthogonal to the first dimension and controlling an array of first actuators to rotate an array of first rotatable micro-mirrors of a microelectromechanical system (MEMS) to set the first angle. The method may also include controlling a second non-MEMS system to set the second angle and projecting, using a light source, a light beam including a light signal towards a mirror assembly, corresponding to the controlled array of first actuators and the controlled non-MEMS system at the set first and second angle. The method may further include receiving a reflection of the light beam, reflected by an object, by the first rotatable micro-mirror, and receiving the reflection of the light beam, reflected by the first rotatable micro-mirror, by a detector.

It is to be understood that both the foregoing general description and the following detailed description are exemplary and explanatory only and are not restrictive of the invention, as claimed.

BRIEF DESCRIPTION OF THE DRAWINGS

The detailed description is set forth with reference to the accompanying figures.

DETAILED DESCRIPTION

Figure 1:
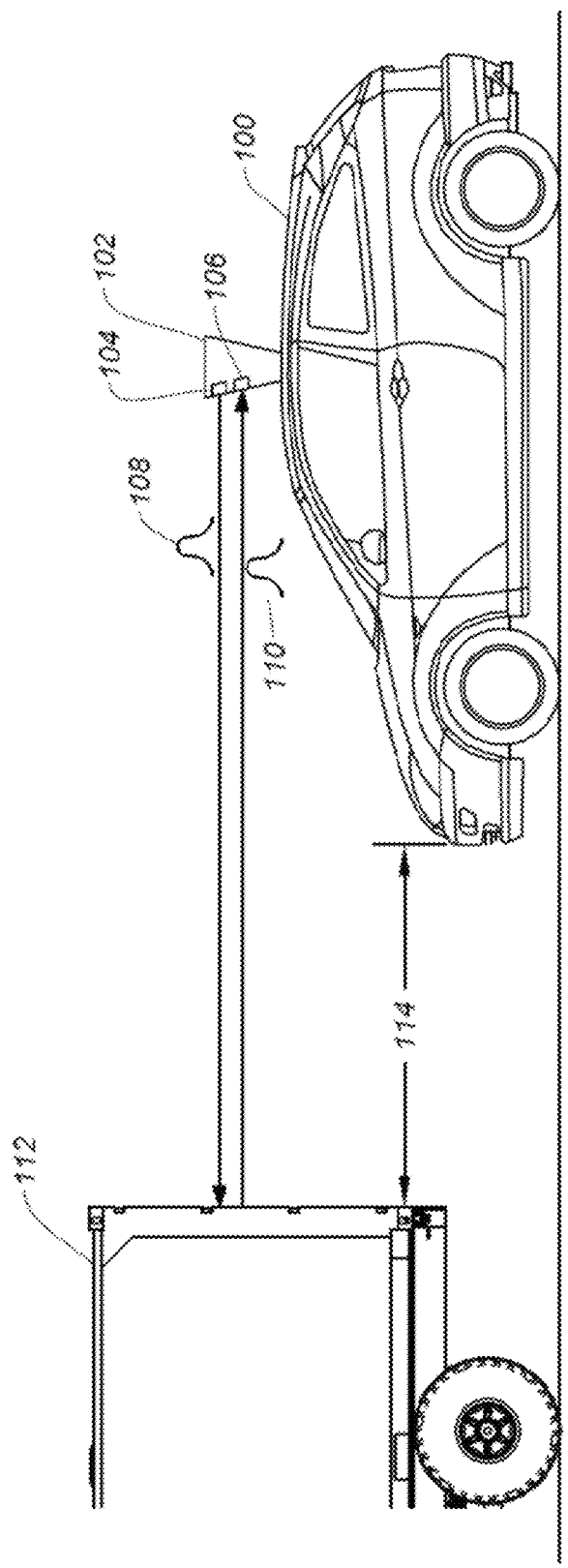
FIG. 1 shows an autonomous driving vehicle utilizing aspects of certain embodiments of the disclosed techniques herein.

Aspects of the present disclosure relate generally to peripheral devices, and in particular to a wireless peripheral device controller, according to certain examples.

In the following description, various examples of a mirror assembly and a light steering system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Light steering can be found in different applications. For example, a Light Detection and Ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a light steering receiver may also include a micro-mirror array to select a direction of incident light to be detected by the receiver, to avoid detecting other unwanted signals. Further, the head light of a manually-driven vehicle can include the light steering system, which can be controlled to focus light towards a particular direction to improve visibility for the driver. In another example, optical diagnostic equipment, such as an endoscope, can include a light steering system to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an actuator (or multiple actuators). The micro-mirrors and actuators can be formed as microelectromechanical systems (MEMS) on a semiconductor substrate which allows integration of the MEMS with other circuitries (e.g., controller, interface circuits, etc.) on the semiconductor substrate. In a micro-mirror assembly, a micro-mirror can be connected to the semiconductor substrate via a connection structure (e.g., a torsion bar, a spring, etc.) to form a pivot. The actuator can rotate the micro-mirror around the pivot, with the connection structure deformed to accommodate the rotation. The array of micro-mirrors can receive incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, are to be detected by the receiver.

In some examples, each micro-mirror assembly may include a single micro-mirror. The single micro-mirror can be coupled with a pair of actuators on a frame of a gimbal structure and rotatable on a first axis. The frame of the gimbal structure is further coupled with the semiconductor substrate and rotatable on a second axis orthogonal to the first axis. A first pair of actuators can rotate the mirror around the first axis with respect to the frame to steer the light along a first dimension, whereas a second pair of actuators can rotate the frame around a second axis to steer the light along a second dimension. Different combinations of angle of rotations around the first axis and the second axis can provide a two-dimensional FOV in which light is to be projected to detect/scan an object. The FOV can also define the direction of incident lights, reflected by the object, are to be detected by the receiver.

Although such arrangements allow the projection of light to form a two-dimensional FOV, there may be a number of potential disadvantages. First, having a single mirror to provide light steering can require a relatively high actuation force to achieve a target FOV and a target dispersion, which can reduce reliability. More specifically, to reduce dispersion, the size of the mirror can be made to match the width of the light beam from the light source, which leads to increased mass and inertia of the mirror. As a result, a larger actuation force (e.g., torque) may be needed to rotate the mirror to achieve a target FOV. The torque required typically is in the order of micro N-m. Subjecting the actuators to larger actuation forces, especially for MEMS actuators, can shorten the lifespan and reduce the reliability of the actuators. Moreover, the reliability of the MEMS actuators may be further degraded when the light steering system relies solely on the single mirror to steer the light, which can become a single point of failure.

Conceptual Overview of Certain Embodiments

Examples of the present disclosure relate to a light steering system that can address the problems described above. Various embodiments of the light steering system can include a plurality of mirrors to perform light steering, such as those shown and described below with respect to FIG. 3A-FIG. 3E, FIG. 5A, FIG. 6, FIG. 7 and FIG. 8. The light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detects light reflected from that location.

In some embodiments, a light steering system may include a light source, a first rotatable mirror, a second rotatable mirror, and a receiver. The first rotatable mirror and the second rotatable mirror can define an output projection path for light transmitted by the light source, or to select an input path for input light to be received by the receiver. The first rotatable mirror and the second rotatable mirror can be rotatable to steer the output projection path at different angles with respect to, respectively, a first dimension and a second dimension orthogonal to the first dimension, to form a two-dimensional FOV.

The light steering system may further include a first actuator configured to rotate the first rotatable mirror around a first axis, a second actuator configured to rotate the second rotatable mirror around a second axis orthogonal to the first axis, and a controller coupled with the first actuator and the second actuator. The controller may control the first actuator and the second actuator to apply a first torque and a second torque to rotate, respectively, the first rotatable mirror and the second rotatable mirror along, respectively, the first axis and the second axis. The controller can control the first actuator and the second actuator to steer the output projection path at different angles with respect to the first dimension and the second dimension according to a movement sequence, such as those shown and described below with respect to FIG. 4 and FIG. 5B, to create the two-dimensional FOV.

Figure 3A:
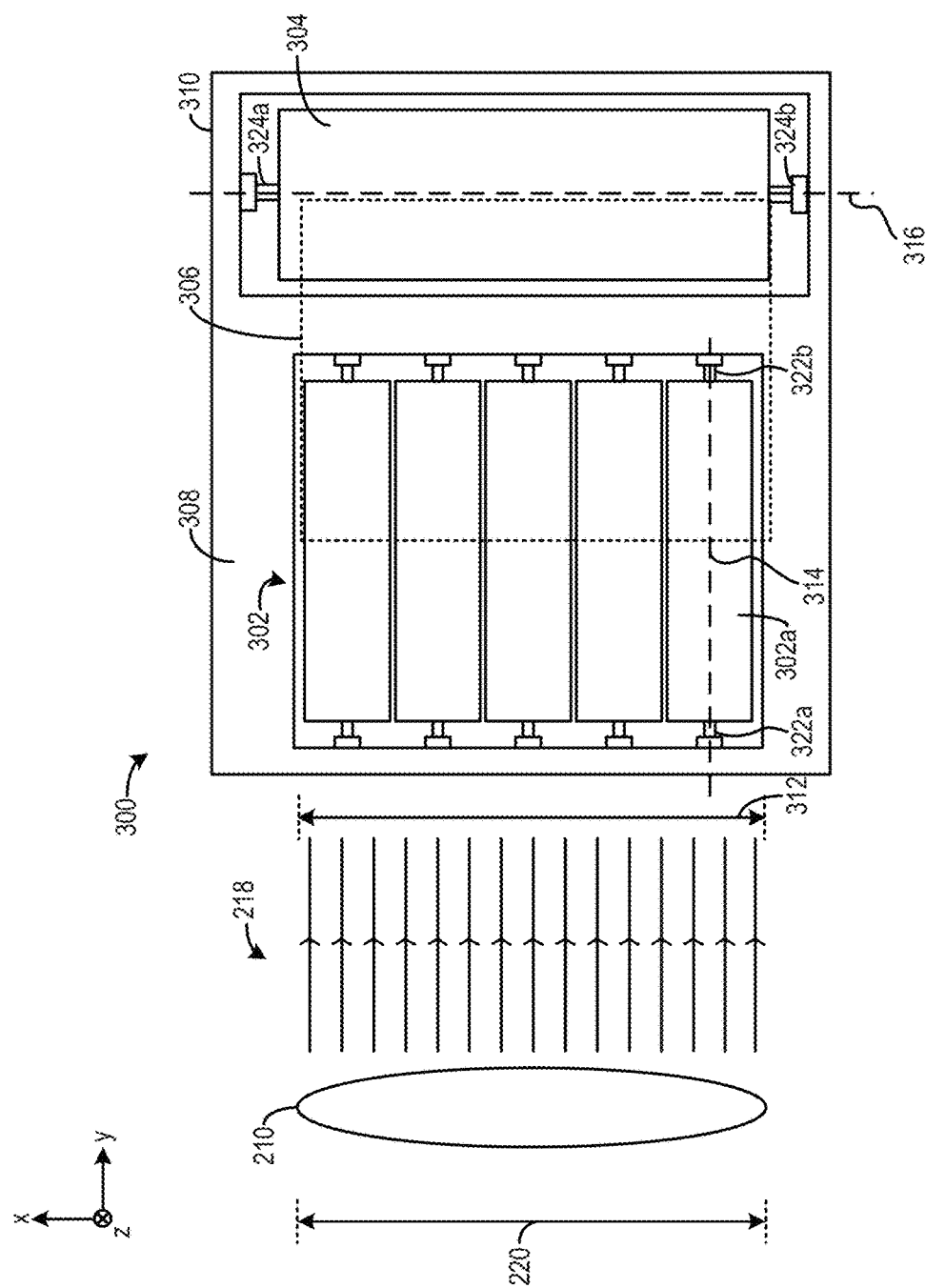
FIG. 3A-FIG. 3E illustrate an example of a mirror assembly and its operations, according to certain embodiments.
Figure 3B:
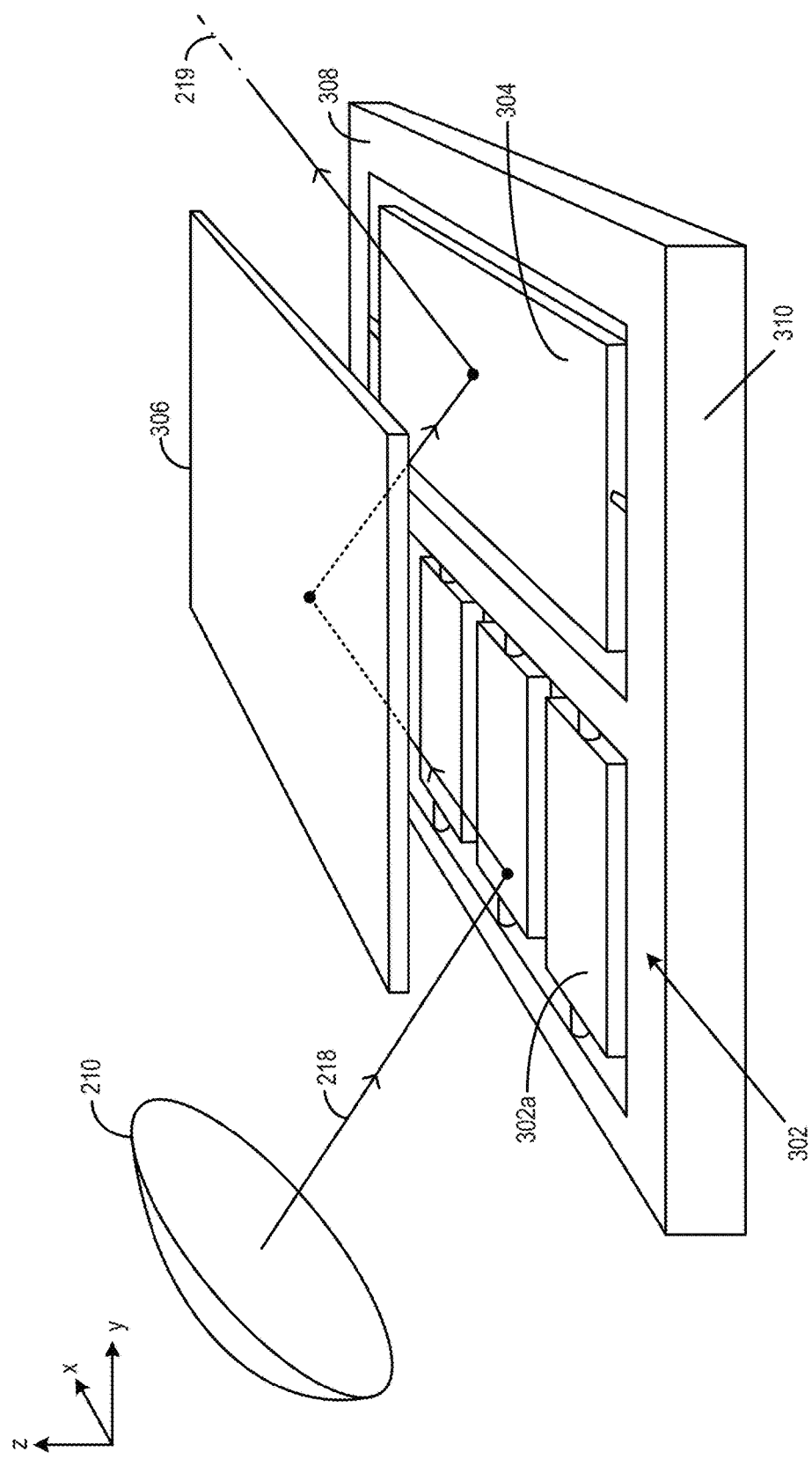

In some embodiments, the first rotatable mirror and the second rotatable mirror can be arranged on the same surface of a semiconductor substrate, as shown in FIG. 3A. The light steering system can further include a stationary third mirror stacked on top of the semiconductor substrate and facing the surface of the semiconductor substrate. As shown in FIG. 3B, light from the light source, or input light from the environment, can be reflected by the first rotatable mirror, which can set a first angle of the output projection path of the light with respect to the first dimension (e.g., an x-axis or a y-axis). The light reflected by the first rotatable mirror can reach the third mirror, which may reflect the light towards the second rotatable mirror. The second rotatable mirror can set an angle of the output projection path or an input path with respect to the second dimension (e.g., the z-axis of FIG. 4D). Different values of the first angle and the second angle can be obtained by rotating the first rotatable mirror and the second rotatable mirror to form the FOV.

Figure 5A:
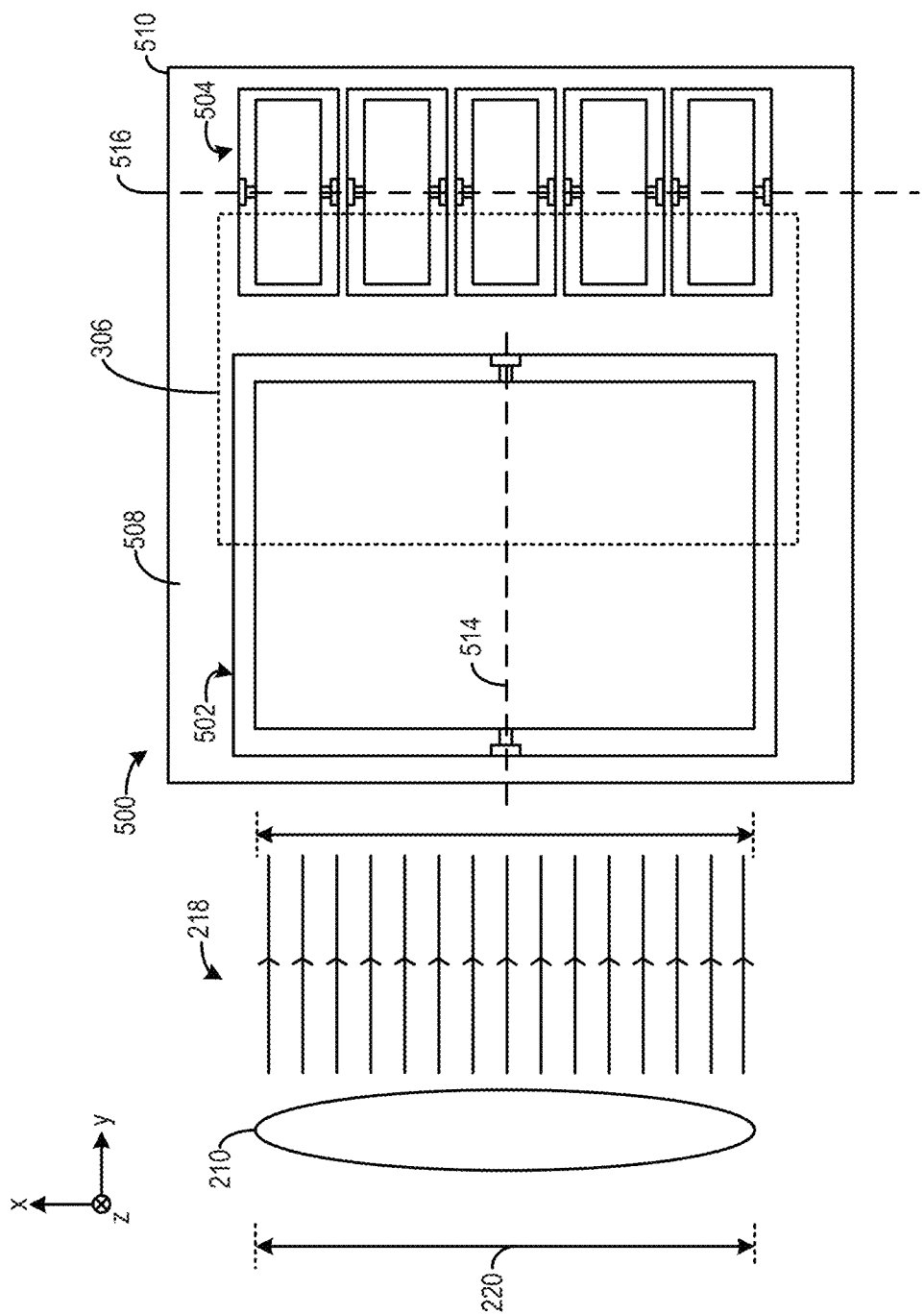
FIG. 5A and FIG. 5B illustrate another example of a mirror assembly, according to certain embodiments.
Figure 6:
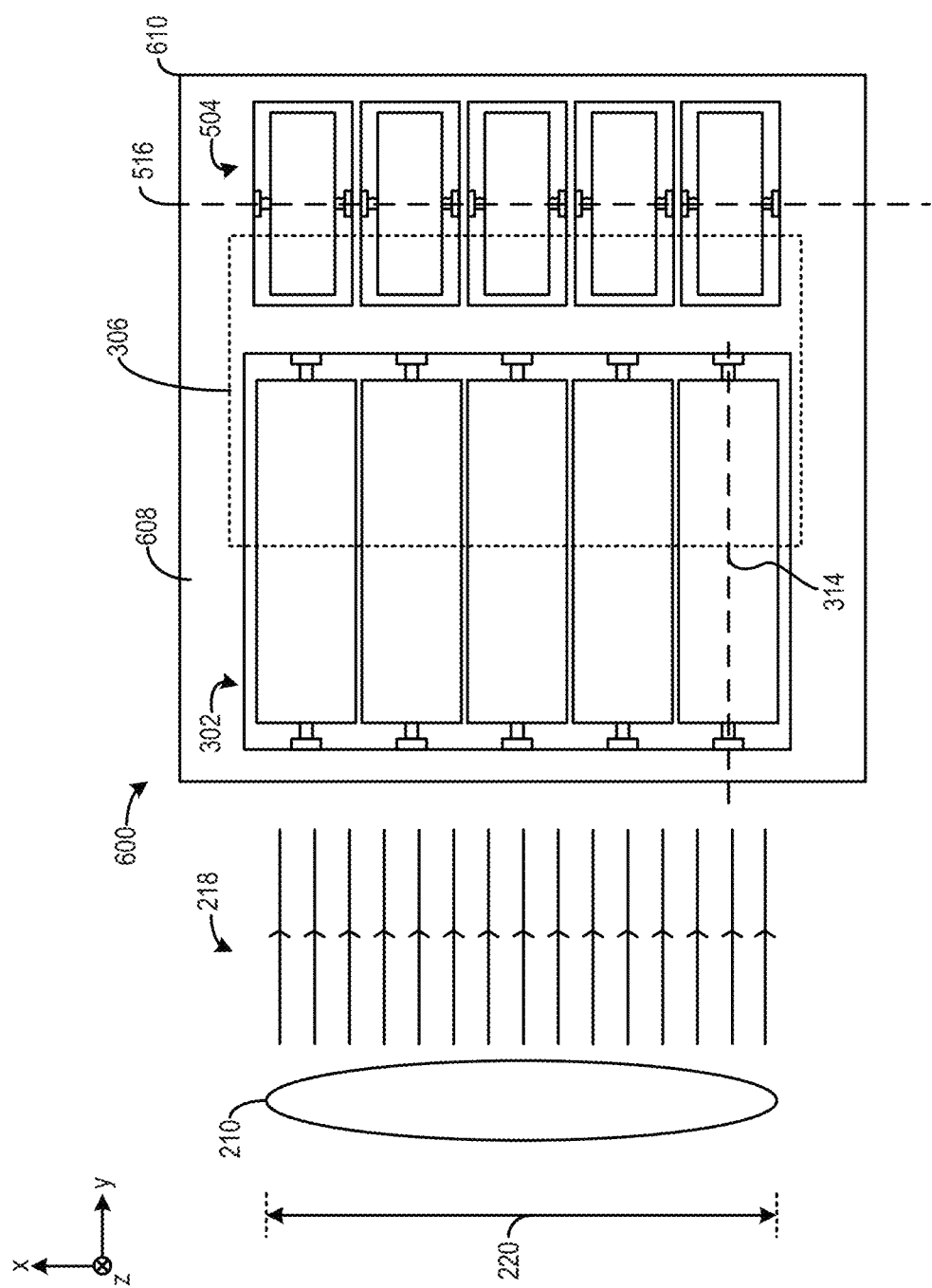
FIG. 6 illustrates another example of a mirror assembly, according to certain embodiments.

In some embodiments, as shown in FIG. 3A, the light steering system can include a first array of mirrors including the first rotatable mirror, with each rotatable mirror of the array rotatable around the first axis, and a single second rotatable mirror rotatable around the second axis. In some embodiments, as shown in FIG. 5A, the light steering system can also include a single first rotatable mirror, and an array of second rotatable mirrors, with each rotatable mirror of the array rotatable around the second axis. In some embodiments, as shown in FIG. 6, the light steering system can also include a first array of rotatable mirrors and a second array of rotatable mirrors. The first array of rotatable mirrors may be rotatable around the first axis. Moreover, the second array of mirrors may be rotatable around the second axis.

In some embodiments, the first rotatable mirror and the second rotatable mirror can be arranged on two different semiconductor substrates, as shown and described below with respect to FIG. 7. The first rotatable mirror can be arranged on a first surface of the first semiconductor, whereas the second rotatable mirror can be arranged on a second surface of the second semiconductor, with the first surface facing the second surface. Light from the light source can be reflected by the first rotatable mirror, which can set the first angle of the output projection path or input path with respect to the first dimension (e.g., the x-axis or the y-axis). The light reflected by the first rotatable mirror can reach the second rotatable mirror, which can rotate around the second axis to set a second angle of the output projection path or the input path with respect to the second dimension (e.g., the z-axis).

Compared with an arrangement where a light steering system uses a single mirror having two axis of rotation to provide two ranges of projection or input angles to form a FOV, certain embodiments of the present disclosure can use a first rotatable mirror and a second rotatable mirror (or an array of first rotatable mirrors and a second rotatable mirror) with each having a single but orthogonal rotational axis to provide the two ranges of angles that form the FOV. Such arrangements can improve reliability (especially where the mirrors are MEMS devices) and precision, and can reduce actuation power, while providing the same or superior FOV and dispersion. First, by using two mirrors to provide two ranges of angles to provide the same FOV as the single mirror, some of the mirrors can be made smaller than the single mirror and may require less actuation force to rotate than the single mirror. The actuation of the two different mirrors can also be independently optimized to further reduce the total actuation force. The reduction of the actuation forces can also reduce the burden on the actuators and increases the lifespan of the actuators. Moreover, due to the smaller mirrors, embodiments of the present disclosure can provide a larger FOV compared with the single mirror implementation in response to the same actuation force. The mirrors can be configured to provide the same mirror surface area as the single mirror, which can provide the same dispersion as the single mirror. In addition, where a plurality of mirrors is involved in the steering of light, the likelihood that any of the mirrors becoming a single source of failure can be mitigated, which can further improve reliability. All of these can improve the robustness and performance of a light steering system over conventional implementations.

Typical System Environment for Certain Embodiments

FIG. 1 illustrates an autonomous vehicle 100 in which the disclosed techniques can be implemented. Autonomous vehicle 100 includes a LiDAR system 102. LiDAR system 102 allows autonomous vehicle 100 to perform object detection and ranging in a surrounding environment. Based on the result of object detection and ranging, autonomous vehicle 100 can maneuver to avoid a collision with the object. LiDAR system 102 can include a light steering system 104 and a receiver 106. Light steering system 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR system 102 can detect the object based on the reception of light signal 110, and can perform a ranging determination (e.g., a distance of the object) based on a time difference between light signals 108 and 110. For example, as shown in FIG. 1, LiDAR system 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR system 102 can determine that object 112 is directly in front of autonomous vehicle 100. Moreover, based on the time difference between T1 and T2, LiDAR system 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR system 102.

Figure 2A:
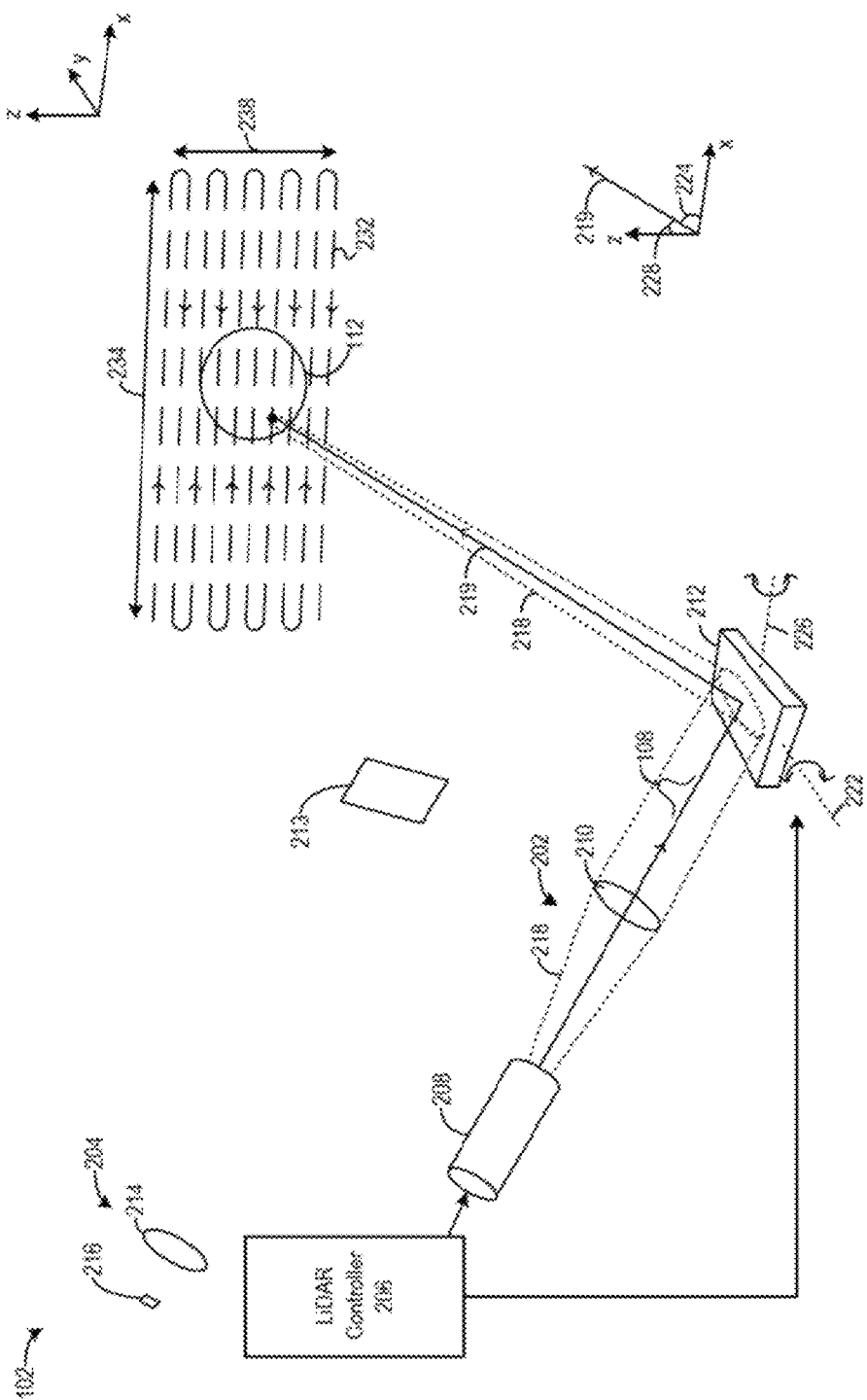
FIG. 2A and FIG. 2B illustrate an example of a light steering system, according to certain embodiments.
Figure 2B:
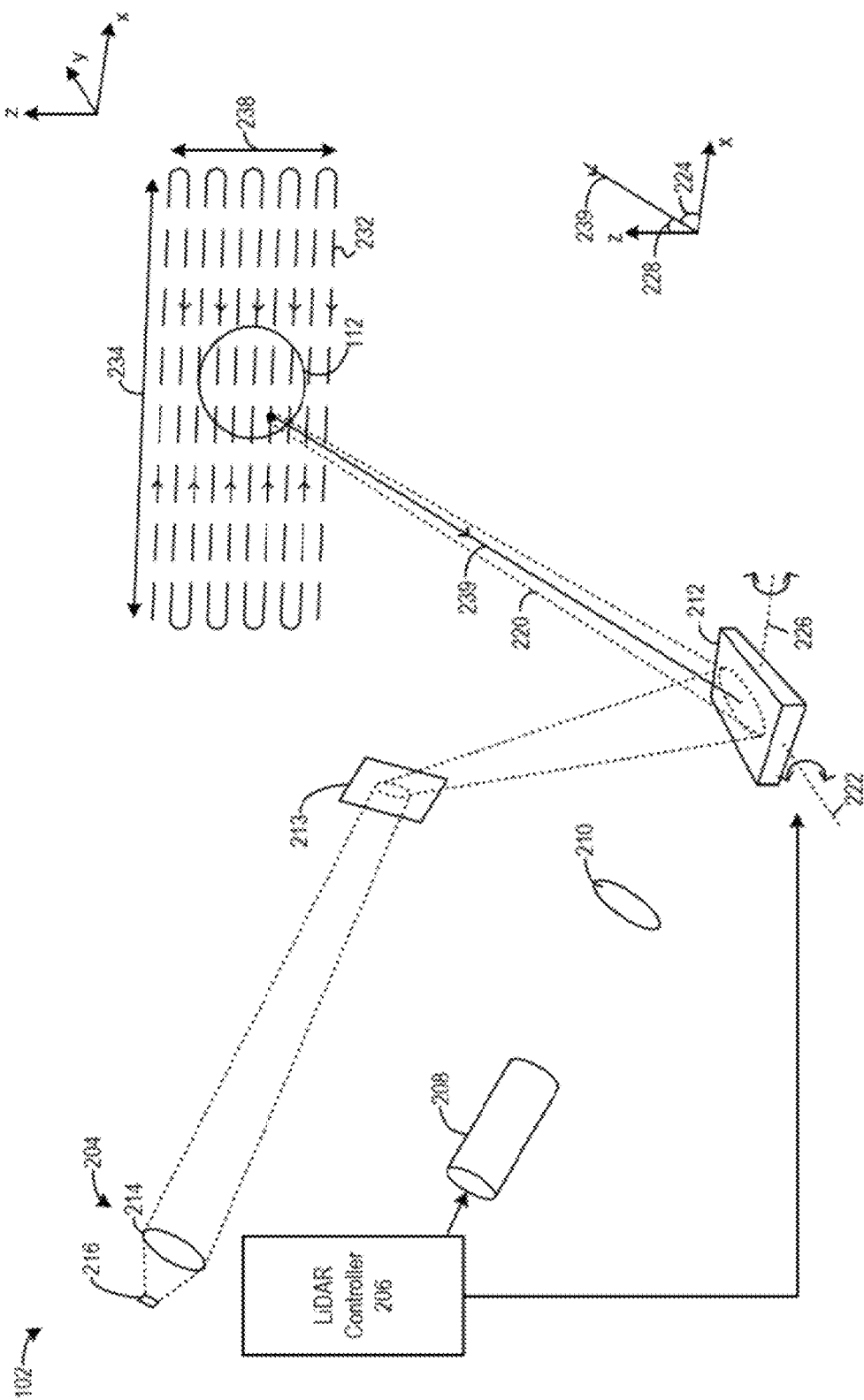

FIGS. 2A-2B illustrate examples of internal components of a LiDAR system 102. LiDAR system 102 includes a transmitter 202, a receiver 204, a LiDAR controller 206 which controls the operations of transmitter 202 and receiver 204. Transmitter 202 includes a light source 208 and a collimator lens 210, whereas receiver 204 includes a collimator lens 214 and a photodetector 216. LiDAR system 102 further includes a mirror assembly 212 and a beam splitter 213. In LiDAR system 102, transmitter 202 and receiver 204 can be configured as a coaxial system to share mirror assembly 212 to perform light steering operation, with beam splitter 213 configured to reflect incident light reflected by mirror assembly 212 to receiver 204.

FIG. 2A illustrates a light projection operation. To project light, LiDAR controller 206 can control light source 208 (e.g., a pulsed laser diode, a source of FMCW signal, AMCW signal, etc.) to transmit light signal 108 as part of collimated light beam 218. Collimated light beam 218 can disperse upon leaving light source 208 and can be converted into collimated light beam 218 by collimator lens 210.

Collimated light beam 218 can be incident upon mirror assembly 212, which can reflect and steer the light beam along an output projection path 219 towards object 112. Mirror assembly 212 can include one or more rotatable mirrors. FIG. 2A illustrates mirror assembly 212 as having one mirror, but as to be described below, in some embodiments, mirror assembly 212 may include a plurality of mirrors.

Collimated light beam 218 may disperse upon leaving the surface of mirror surface of mirror assembly 212. Collimated light beam 218 can form a dispersion angle with respect to projection path 219 over the length and the width of the mirror surface. The dispersion angle of collimated light beam 218 can be given by the following equation:

$$\alpha = \frac{\lambda}{D \times \pi} \quad \text{(Equation 1)}$$

In Equation 1, $\alpha$ is the dispersion angle, $\lambda$ is the wavelength of light beam 218, whereas D is the length (or width) of the mirror surface. Light beam 218 can disperse at a dispersion angle $\alpha_L$ with respect to output projection path 219 over the length (L) of the mirror surface, and at a dispersion angle $\alpha_W$ with respect to projection path 219 over the width (W) of the mirror surface. It is desirable to reduce the dispersion angle to focus the light beam power along projection path 219, to improve the resolution of object detection, ranging, and imaging. To reduce the dispersion angle, the length and width D of the mirror surface can be increased to match with the aperture length.

Mirror assembly 212 further includes one or more actuators (not shown in FIG. 2A) to rotate the rotatable mirrors. The actuators can rotate the rotatable mirrors around a first axis 222 and can rotate the rotatable mirrors along a second axis 226. As described in more detail below, the rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204.

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only divert light beam 220 propagating along incident light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not to receive other signals. As a result, the effect of environment disturbance on the ranging/imaging of the object can be reduced, and the system performance can be improved.

Examples of Mirror Assemblies

Figure 3C:
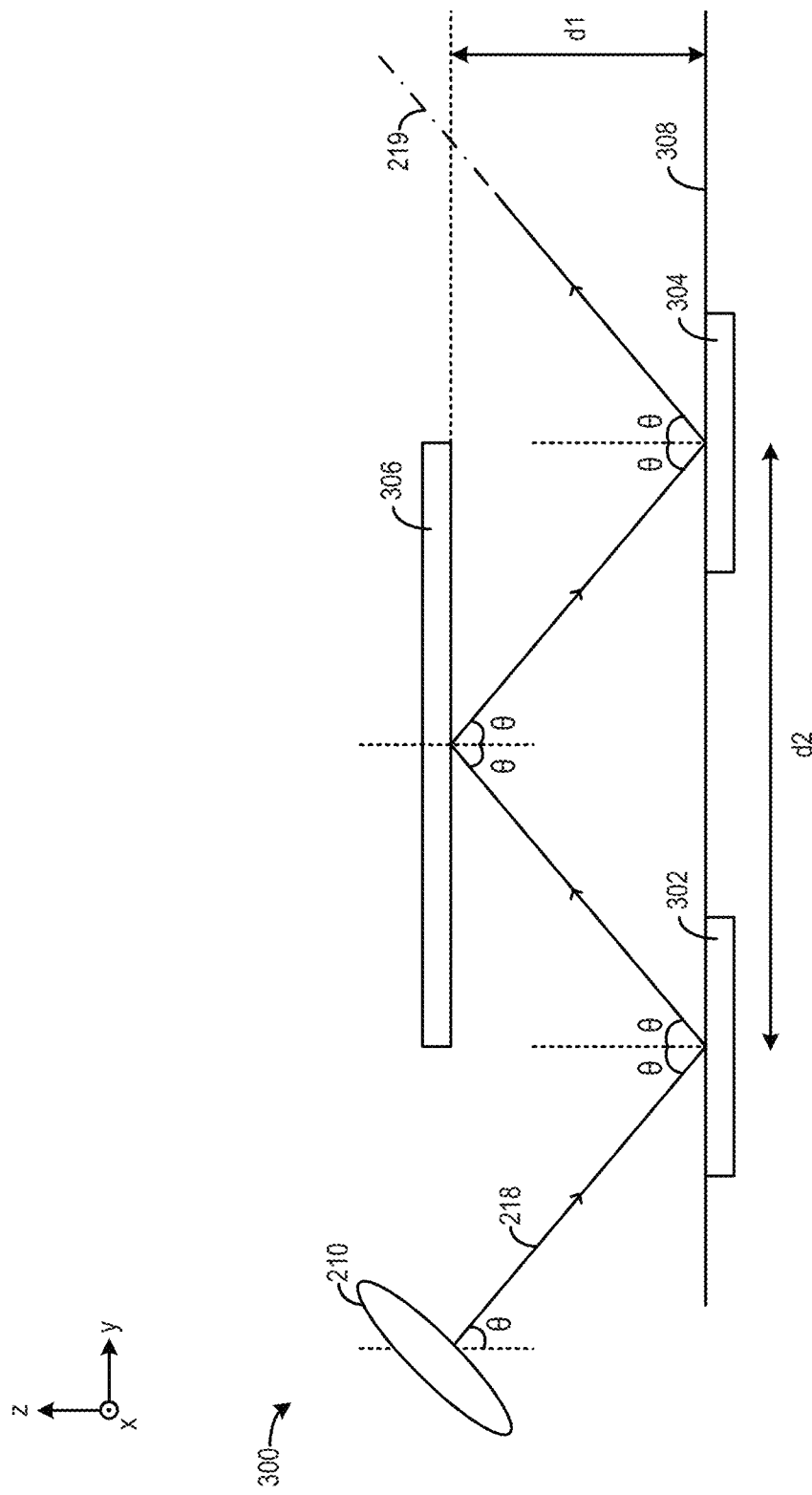

FIG. 3A-FIG. 3E illustrate an example of a mirror assembly 300, according to embodiments of the present disclosure. Mirror assembly 300 can be part of the light steering system. FIG. 3A illustrates a top view of mirror assembly 300, FIG. 3B illustrates a perspective view of mirror assembly 300, whereas FIG. 3C illustrates a side view of mirror assembly 300. As shown in FIG. 3A, mirror assembly 300 can include an array of first rotatable mirrors 302, a second rotatable mirror 304, and a stationary mirror 306. The total mirror surface area of the array of first rotatable mirrors 302 is identical to the mirror surface area of second rotatable mirror 304 and of stationary mirror 306. The array of first rotatable mirrors 302 and second rotatable mirror 304 can be MEMS devices implemented on a surface 308 of a semiconductor substrate 310. Stationary mirror 306 can be positioned above semiconductor substrate 310. In some embodiments, stationary mirror 306 can be included within the same integrated circuit package as semiconductor substrate 310 to form an integrated circuit. In some embodiments, stationary mirror 306 can also be positioned external to the integrated circuit package that houses semiconductor substrate 310.

Referring to FIG. 3B and FIG. 3C, in one configuration, array of first rotatable mirrors 302 can receive collimated light beam 218 from collimator lens 210, reflect collimated light beam 218 towards stationary mirror 306, which can reflect collimated light beam 218 towards second rotatable mirror 304. Second rotatable mirror 304 can reflect collimated light beam 218 received from stationary mirror 306 as an output along output projection path 219. In another configuration (not shown in the figures), second rotatable mirror 304 can receive collimated light beam 218 from collimator lens 210 and reflect collimated light beam 218 towards stationary mirror 306, which can reflect collimated light beam 218 towards array of first rotatable mirrors 302. Array of first rotatable mirrors 302 can reflect collimated light beam 218 as an output along output projection path 219. In a case where mirror assembly 300 is part of the receiver, the array of first rotatable mirrors 302 and second rotatable mirror 304 can also select incident light direction 239 for receiver 204 similar to the selection of direction of output projection path 219. As described in further detail below, array of first rotatable mirrors 302 and second rotatable mirror 304 change an angle of output projection path 219 with respect to, respectively, the x-axis and the z-axis, to form a two-dimensional FOV.

As described above, the total mirror surface area of the array of first rotatable mirrors 302 is identical to the mirror surface area of second rotatable mirror 304 and of stationary mirror 306. Moreover, each dimension (e.g., length and width) of the mirror surface area provided by each of the array of first rotatable mirrors 302, second rotatable mirror 304, and stationary mirror 306 can match the aperture length of collimator lens 210. With such arrangements, each of the array of first rotatable mirrors 302, second rotatable mirror 304, and stationary mirror 306 can receive and reflect a majority portion of collimated light beam 218.

Moreover, as shown in FIG. 3C, the separation between stationary mirror 306 and surface 308 (which includes an array of first rotatable mirrors 302 and second rotatable mirror 304, denoted as d1, as well as the separation between the center points of an array of first rotatable mirrors 302 and second rotatable mirror 304, denoted as d2, can be related to incident angle θ of collimated light beam 218 with respect to the z-axis, as follows:

$$\frac{\frac{d2}{2}}{d1} = \tan(\theta) \quad \text{(Equation 2)}$$

In Equation 2, the ratio between half of d2 (the distance between the center points of an array of first rotatable mirrors 302 and second rotatable mirror 304) and d1 (the distance between stationary mirror 306 and surface 308) can be defined by applying tangent function to the incident angle θ of collimated light beam 218.

Referring back to FIG. 3A, each rotatable mirror of the array of first rotatable mirrors 302 (e.g., first rotatable mirror 302a) is rotatable around a first axis 314, whereas second rotatable mirror 304 is rotatable around a second axis 316 which is orthogonal to first axis 314. Each rotatable mirror of the array of first rotatable mirrors 302, as well as second rotatable mirror 304, is coupled with a pair of rotary actuators, such as comb drive, piezoelectric device, electromagnetic device, etc., to rotate the mirror. For example, first rotatable mirror 302a is coupled with and rotary actuators 322a and 322b, whereas second rotatable mirror 304 is coupled with rotary actuators 324a and 324b. Each of first rotatable mirror 302a (and the rest of array of first rotatable mirrors 302) and second rotatable mirror 304 can independently move output projection path 219 along, respectively, the x-axis and the z-axis, to form a FOV.

Figure 3D:
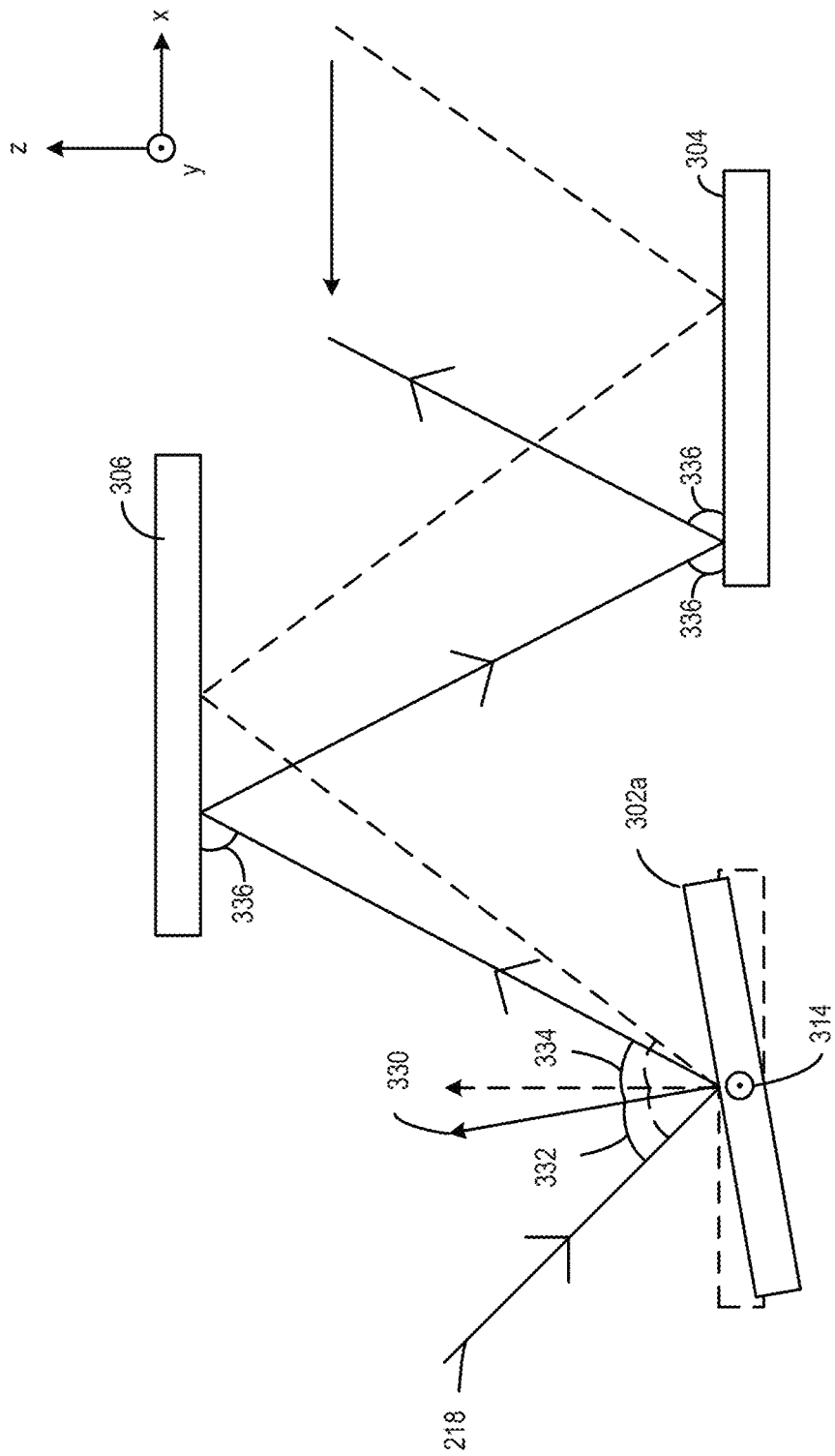

FIG. 3D illustrates an example of setting an angle of output projection path 219 with respect to the x-axis based on the rotation movement of first rotatable mirror 302a. FIG. 3D shows a side view of first rotatable mirror 302a with first axis 314, stationary mirror 306, and second rotatable mirror 304. First axis 314 is aligned with the y-axis. The dotted lines show the orientations of first rotatable mirror 302a and normal vector 330 of first rotatable mirror 302a before rotation, while the solid lines show the orientations of first rotatable mirror 302a and normal vector 330 after a counter-clockwise rotation. As first rotatable mirror 302a rotates counter-clockwise, normal vector 330 of first rotatable mirror 302a also rotates counter-clockwise, and the angle of incidence 332 of collimated light beam 218 with respect to the rotated normal vector 330 reduces. As the angle of reflection 334 of collimated light beam 218 is equal to the angle of incidence 332, the reflected collimated light beam 218 also rotates counter-clockwise and hit stationary mirror 306 at an increased angle 336. Collimated light beam 218 is also reflected from stationary mirror 306 at the same angle 336 towards second rotatable mirror 304, which can reflect light beam 218 along output projection path 219 or incident light direction 239 that also forms angle 336 with the x-axis. Each rotatable mirror of the array of first rotatable mirrors 302 can be controlled to rotate by the same angle of rotation and at the same direction (clockwise or counterclockwise) around first axis 314, so that the array can collectively set output projection path 219 of collimated light beam 218, or incident light direction 239, to form angle 336 with respect to the x-axis.

Figure 3E:
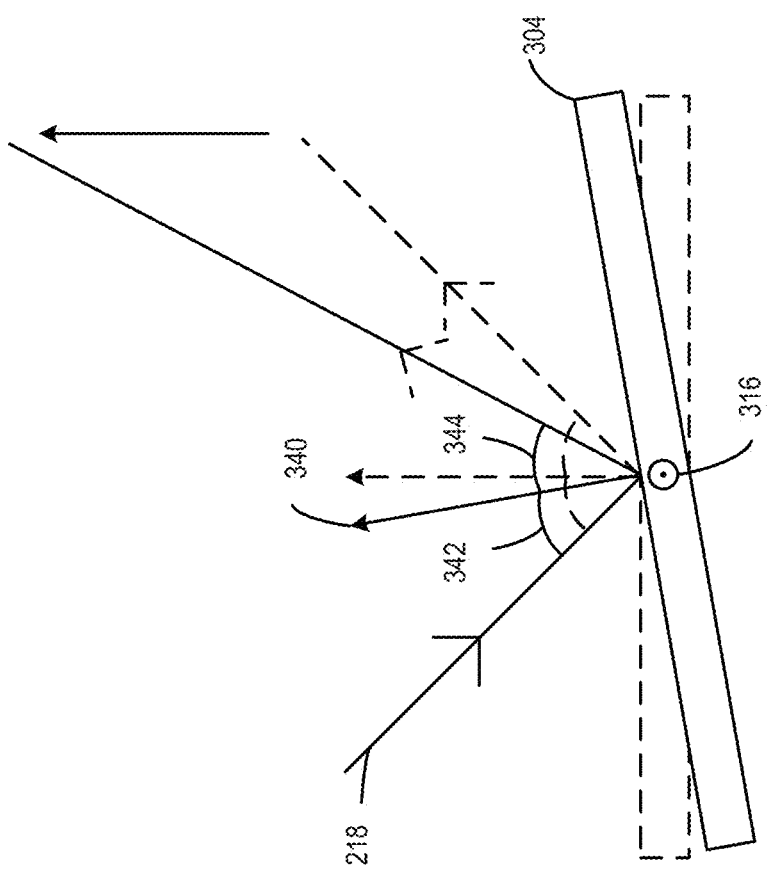
Figure 3E:
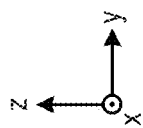

FIG. 3E illustrates an example of movement of output projection path 219 based on the rotation movement of second rotatable mirror 304. FIG. 3E is a side view of second rotatable mirror 304 with second axis 316 pointing out of paper. The dotted lines show the orientations of second rotatable mirror 304 and normal vector 340 of second rotatable mirror 304 before rotation, while the solid lines show the orientations of second rotatable mirror 304 and normal vector 340 after a counter-clockwise rotation. As second rotatable mirror 304 rotates counter-clockwise, normal vector 340 of second rotatable mirror 304 also rotates counter-clockwise, and the angle of incidence 342 of collimated light beam 218 with respect to the rotated normal vector 340 reduces. As the angle of reflection 344 of collimated light beam 218 is equal to the angle of incidence 342, output projection path 219 of reflected collimated light beam 218 moves along the z-axis by a distance d4 as indicated by the arrow. Combined with the rotation of first rotatable mirror 302a, output projection path 219 can move along both the x-axis and the z-axis to form a two-dimensional FOV. It is understood that incident light direction 239 can also be adjusted based on the rotation movement of second rotatable mirror 304 in a similar fashion as output projection path 219.

Figure 4:
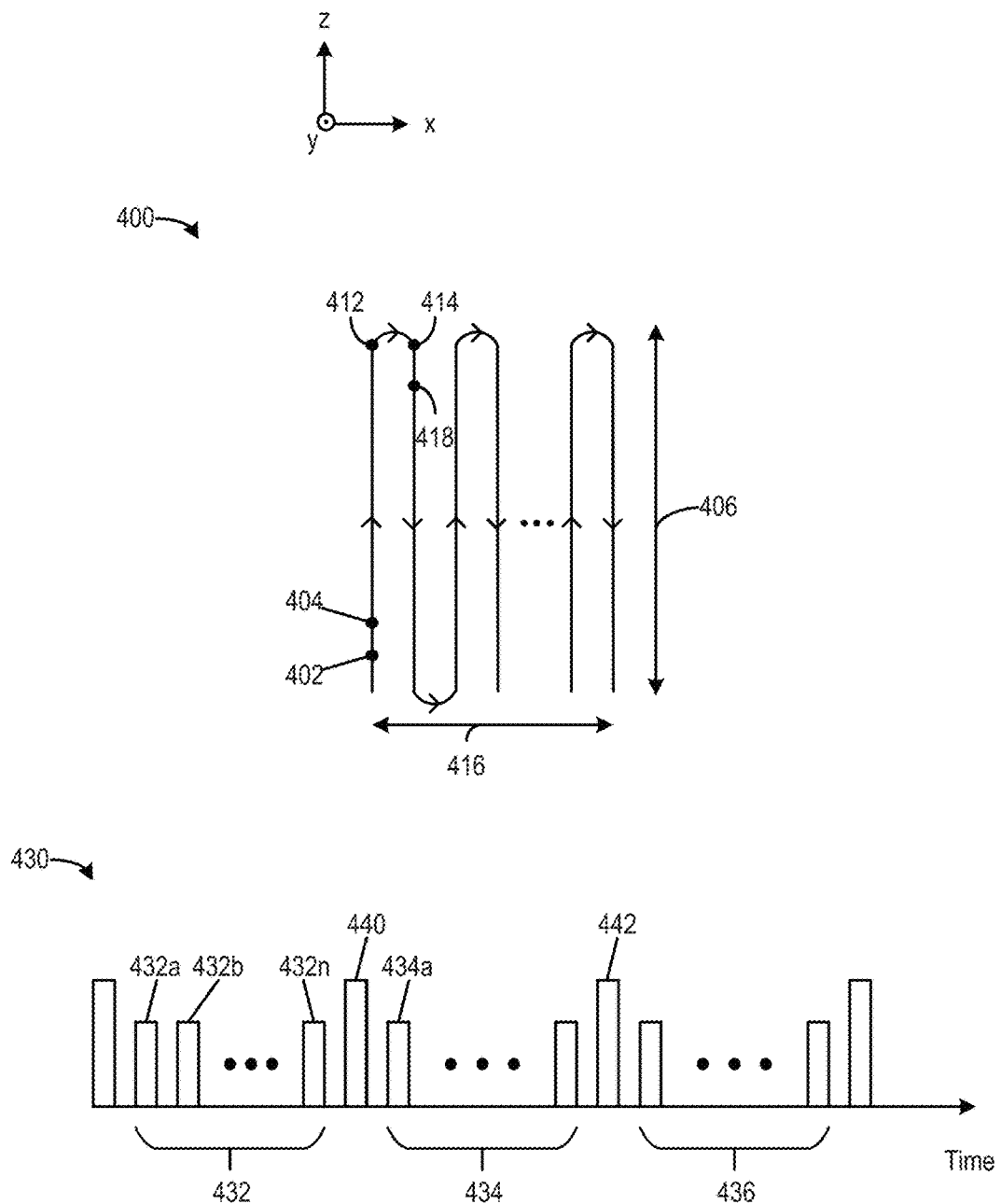
FIG. 4 illustrates an example of operation of the mirror assembly of FIG. 3A-FIG. 3E to provide a two-dimensional field of view (FOV), according to certain embodiments.
Figure 5B:
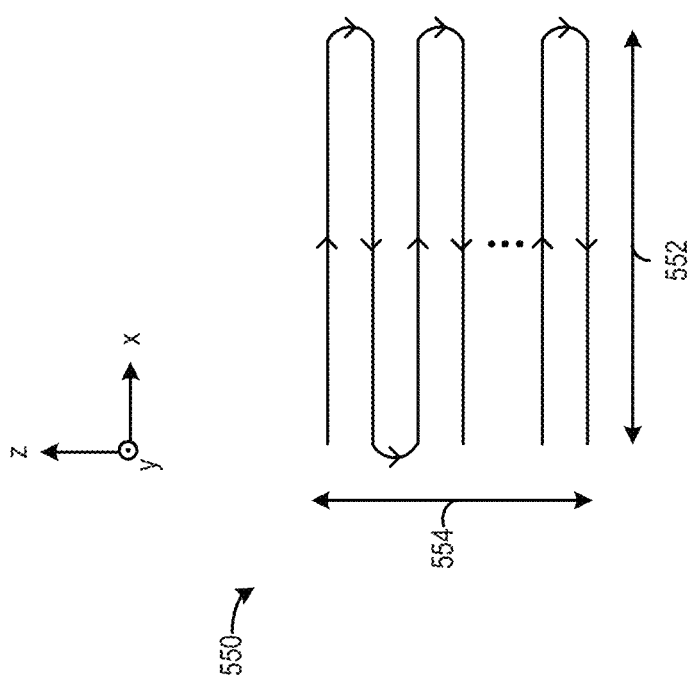

FIG. 4 illustrates an example operation of mirror assembly 300 to provide a two-dimensional FOV. The diagram on the top of FIG. 4 illustrates a movement sequence 400 of an angle of output projection path 219 provided by the rotations of array of first rotatable mirrors 302 and second rotatable mirror 304. As shown in FIG. 4, LiDAR controller 206 can control rotary actuators 324a and 324b to rotate second rotatable mirror 304 to set different angles of output projection path 219 with respect to the z-axis, for example, at angles represented by points 402 and 404, to within a first angle range 406. LiDAR controller 206 can also control the rotary actuators of array of first rotatable mirrors 302 (e.g., rotary actuators 322a and 322b) to set different angles of output projection path 219 with respect to the x-axis, for example, at angles represented by points 412 and 414, to provide a second angle range 416, and the two angle ranges can define a FOV.

The figure on the bottom of FIG. 4 illustrates a control signals sequence 430, with respect to time, to generate movement sequence 400 of output projection path 219. In some embodiments, movement sequence 400 can be provided to LiDAR controller 206, which can generate control signals sequence 430 based on movement sequence 400. Control signals sequence 430 comprises first dimension control signals sequences 432, 434, 436, etc., of control signals for the rotary actuators of second rotatable mirrors 304 to change the angle of output projection path 219 (or incident light direction 239) with respect to a first dimension (e.g., z-axis). Control signals sequence 430 further include a second dimension control signal between two first dimension control signals sequences. For example, there is a second dimension control signal 440 between first dimension control signals sequences 432 and 434. Further, there is a second dimension control signal 442 between first dimension control signals sequences 434 and 436. The second dimension control signals are for the rotary actuators of array of first rotatable mirrors 302 to change the angle of output projection path 219 (or incident light direction 239) with respect to a second dimension (e.g., x-axis).

Each control signal in control signals sequences 432, 434, 436, etc., can cause the rotary actuators of second rotatable mirror 304 to generate a torque force to increment the angle of rotation of the second rotatable mirror 304 around second axis 316. For example, first dimension control signal 432a can correspond to point 402, whereas first dimension control signal 432b can correspond to point 404. Each of first dimension control signals sequences 432, 434, and 436 can cause a sweep of angles of output projection path 219 (or incident light direction 239) across first angle range 406 with respect to the z-axis by controlling the angle of rotation of the second rotatable mirror. At the end of first angle range 406, a second dimension control signal can be provided to change the angle of projection path 219 (or incident light direction 239) with respect to the x-axis before the next first dimension control signals sequence starts. For example, first dimension control signal 432n corresponds to point 412 which is at the end of first angle range 406. Following first dimension control signal 432b is second dimension control signal 440, which can rotate array of first rotatable mirrors 302 to move output projection path 219 (or incident light direction 239) from points 412 to 414 along the x-axis. Following second dimension control signal 440, first dimension control signals sequence 434 starts, and first dimension control signal 434a can rotate second rotatable mirror 304 to move the angle of output projection path 219 (or incident light direction 239) with respect to the z-axis from an angle represented by point 414 to an angle represented by 418, while keeping the angle with respect to the x-axis constant.

In some embodiments, first dimension control signals and second dimension control signals can be independently optimized to reduce total actuation forces and power. For example, first dimension control signals can be provided to the rotary actuators at a relatively high frequency close to the natural frequency of second rotatable mirror 304 to induce harmonic resonance of the mirror. Such arrangements allow use of smaller torques to rotate second rotatable mirror 304, which is advantageous given that second rotatable mirror 304 can be the largest mirror within mirror assembly 300 and has considerable mass and inertia. On the other hand, second dimension control signals can be provided to the rotary actuators at a relatively low frequency to operate each rotatable mirror of array of first rotatable mirrors 302 as quasi-static loads. The torques required to rotate the mirrors of array of first rotatable mirrors 302 may be relatively low, given that the mirrors are small and have small mass and inertia. In some embodiments, first dimension control signals can be in the form of high frequency sinusoidal signals, pulse width modulation (PWM) signals, etc., whereas second dimension control signals can be in the form of low frequency saw-tooth signals.

In some embodiments, in addition to movement sequence 400, a feedback mechanism can also be provided to LiDAR controller 206 to generate control signals sequence 430. The feedback mechanism includes a set of sensors (e.g., capacitive sensors) to measure actual angles of rotation at the rotary actuators. The feedback mechanism enables LiDAR controller 206 to adjust the first dimension and second dimension control signals provided to the rotary actuators based on monitoring the actual angle of rotations at the rotary actuators, to improve the precision of the light steering operation. The adjustment can be performed to compensate for, for example, uncertainties and mismatches in the masses of the mirrors, driving strength of the rotary actuators, etc.

As an example, LiDAR controller 206 can perform adjustment of the first dimension and second dimension control signals in a calibration sequence. LiDAR controller 206 may store a set of initial settings (e.g., voltage, current, etc.) for the first dimension and second dimension control signals based on a set of expected masses of the mirrors and driving strength of the rotary actuators. During the calibration process, LiDAR controller 206 can provide different first dimension and second dimension control signals to create different angles of rotations at the rotary actuators. LiDAR controller 206 can monitor the actual angles of rotations at the rotary actuators when the first dimension and second dimension control signals are provided, compare the actual angles of rotations against the target angles of rotations to determine differences, and adjust the first dimension and second dimension control signals to account for the differences. For example, each rotatable mirror of array of first rotatable mirrors 302 is supposed to rotate at the same angle of rotation. LiDAR controller 206 can measure the actual angles of rotation of each rotatable mirror of array of first rotatable mirrors 302 using the capacitive sensors and determine a deviation of each actual angle from the target angle of rotation for each rotatable mirror. LiDAR controller 206 can adjust the second dimension control signals for the rotary actuators of each rotatable mirror (e.g., rotary actuators 322a and 322b) based on the deviations to ensure that each rotatable mirror rotates by the same target angle of rotation.

Compared with a single mirror assembly, mirror assembly 300 can provide same or superior FOV and dispersion performance while reducing the actuation force and power and improving reliability. First, each rotatable mirror of the array of first rotatable mirrors 302 is substantially smaller than a single mirror having a comparable length and width and dispersion performance, even if the mirrors are driven as quasi-static loads. As a result, each rotatable mirror of the array of first rotatable mirrors 302 requires substantially smaller torque to provide the same FOV as the single mirror assembly. Moreover, although the mirror surface area of the second rotatable mirror 304 is similar to the area of the single mirror arrangement, the torque needed to rotate second rotatable mirror 304 can be substantially reduced by driving second rotatable mirror 304 at close to a natural frequency to induce harmonic resonance. Such arrangements allow substantial reduction in the required torque to achieve a target FOV. The reduction of torque also reduces the burden on the rotary actuators and increases their lifespan. In addition, as a plurality of mirrors are involved in the steering of light, the likelihood of any of the mirror becoming a single source of failure can be mitigated, which can further improve reliability.

FIG. 5A illustrates another example of a mirror assembly 500, according to embodiments of the present disclosure. Mirror assembly 500 can be part of a light steering system. As shown in FIG. 5A, mirror assembly 500 can include a first rotatable mirror 502, an array of second rotatable mirrors 504, and stationary mirror 306. Each of first rotatable mirror 502, array of second rotatable mirror 504, and stationary mirror 306 can have substantially same mirror surface area and can have dimensions matching the aperture length of lens 210, as in other examples described above. First rotatable mirror 502, an array of second rotatable mirrors 504 can be MEMS devices implemented on a surface 508 of a semiconductor substrate 510. Stationary mirror 306 can be positioned above semiconductor substrate 510. First rotatable mirror 502 may receive collimated light beam 218 from lens 210, reflect the collimated light beam 218 towards stationary mirror 306, which can in turn reflect collimated light beam 218 towards array of second rotatable mirrors 504. Array of second rotatable mirrors 504 can reflect the collimated light beam 218 received from stationary mirror 306 as output along output projection path 219. First rotatable mirror 502 is rotatable around a first axis 514, whereas each rotatable mirror of the array of second rotatable mirrors 504 is rotatable around a second axis 516 which is orthogonal to first axis 514. Just as array of first rotatable mirrors 302 of FIG. 3A, the rotation of first rotatable mirror 502 can set an angle of output projection path 219 (or incident light direction 239) with respect to the x-axis, whereas the rotation of array of second rotatable mirrors 504 can set an angle of output projection path 219 (or incident light direction 239) with respect to the z-axis.

First rotatable mirror 502 and array of second rotatable mirror 504 can independently change the angle of output projection path 219 (or incident light direction 239) with respect to, respectively, the x-axis and the z-axis, to form a two-dimensional FOV. The rotation of first rotatable mirror 502 and array of second rotatable mirrors 504 can be controlled based on a movement sequence 550 of FIG. 5B. First rotatable mirror 502 can be controlled by first dimension control signals to move output projection path 219 (or incident light direction 239) along the x-axis within a movement range 552, whereas array of second rotatable mirrors 504 can be controlled by second dimension control signals to move projection path along the z-axis within a movement range 554. Similar to the arrangements described in FIG. 4, first dimension control signals can be provided at a relatively high frequency close to the natural frequency of first rotatable mirror 502 to induce harmonic resonance, whereas second dimension control signals can be provided at a relatively low frequency to drive each of the array of second rotatable mirrors 504 as quasi-static loads.

In some examples, a mirror assembly can include two arrays of rotatable mirrors to perform light steering along a first dimension (e.g., the x-axis) and a second dimension (e.g., the z-axis). FIG. 6 illustrates an example of a mirror assembly 600 that includes array of first rotatable mirrors 302 of FIG. 3A and array of second rotatable mirrors 504 of FIG. 5A on a surface 608 of a semiconductor substrate 610. Mirror assembly 600 further includes stationary mirror 306 positioned above semiconductor substrate 610. Array of first rotatable mirrors 302 is rotatable around first axis 314, whereas array of second rotatable mirrors 504 is rotatable around second axis 516 which is orthogonal to first axis 314. Array of first rotatable mirrors 302 and array of second rotatable mirror 504 can independently change the angle of output projection path 219 with respect to, respectively, the x-axis and the z-axis, to form a two-dimensional FOV as described above.

Figure 7:
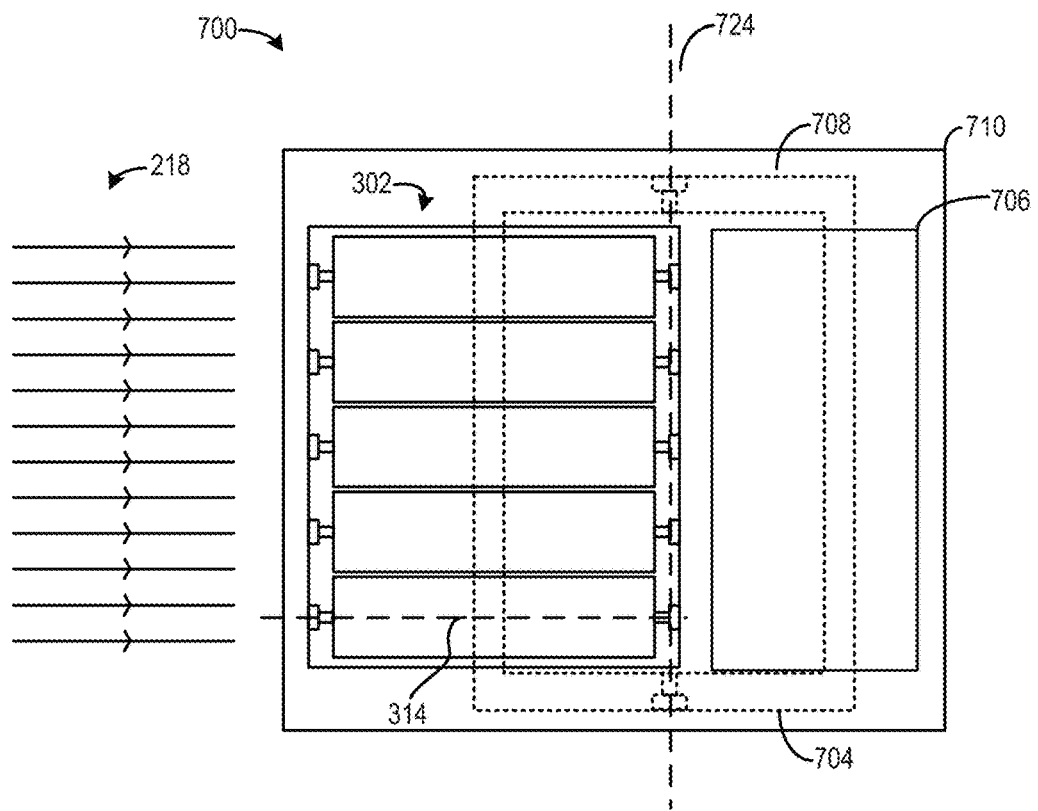
FIG. 7 illustrates another example of a mirror assembly, according to certain embodiments.
Figure 7:
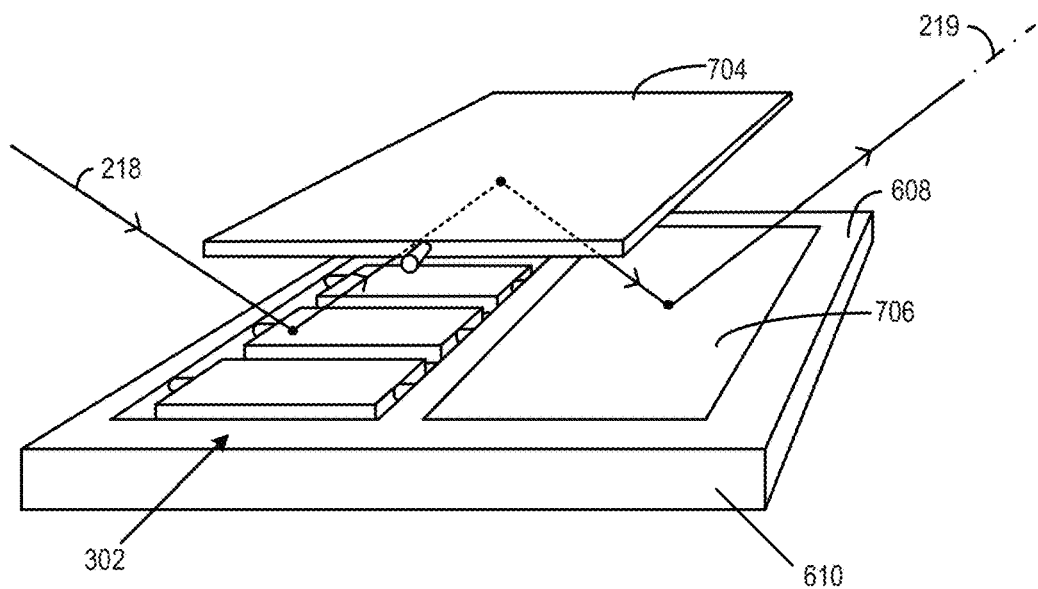

FIG. 7 illustrates another example of a mirror assembly 700, according to embodiments of the present disclosure. Mirror assembly 700 can be part of the light steering system. The top figure of FIG. 7 shows a top view of mirror assembly 700, whereas the bottom figure of FIG. 7 shows a perspective view of mirror assembly 700. As shown in FIG. 7, mirror assembly 700 can include array of first rotatable mirrors 302, a second rotatable mirror 704, and an optional mirror 706 which can be stationary or rotatable. Array of first rotatable mirrors 302 and mirror 706 can be implemented as a surface 708 of a first semiconductor substrate 710, whereas second rotatable mirror 704 can be implemented on a second semiconductor substrate (not shown in FIG. 7) and facing array of first rotatable mirrors 302 and mirror 706. Each of array of first rotatable mirrors 302, second rotatable mirror 704, and mirror 706 may have substantially identical mirror surface area having each dimension matching the aperture length of collimator lens 210, as in other examples described above. Array of first rotatable mirrors 302 can receive collimated light beam 218 (or divert light beam 220) and reflect the light towards second rotatable mirror 704, which can reflect the light from array of first rotatable mirrors 302 towards mirror 706. Mirror 706 can reflect the light received from second rotatable mirror 704 as output along output projection path 219. Mirror 706 can also reflect input light towards second rotatable mirror 704, and only light that propagates along incident light direction 239 will be reflected to array of first rotatable mirrors 302. Array of first rotatable mirrors 302 is rotatable around first axis 314, whereas second rotatable mirror 704 is rotatable around second axis 724 which is orthogonal to first axis 314. The rotation of each rotatable mirror of array of first rotatable mirrors 302 can set an angle of output projection path 219 (or incident light direction 239) with respect to the x-axis, whereas the rotation of second rotatable mirror 704 can set an angle of output projection path 219 (or incident light direction 239) with respect to the z-axis. Mirror 706 can be stationary or can be rotatable to allow further adjustment of the direction of output projection path 219 (or incident light direction 239).

Figure 8:
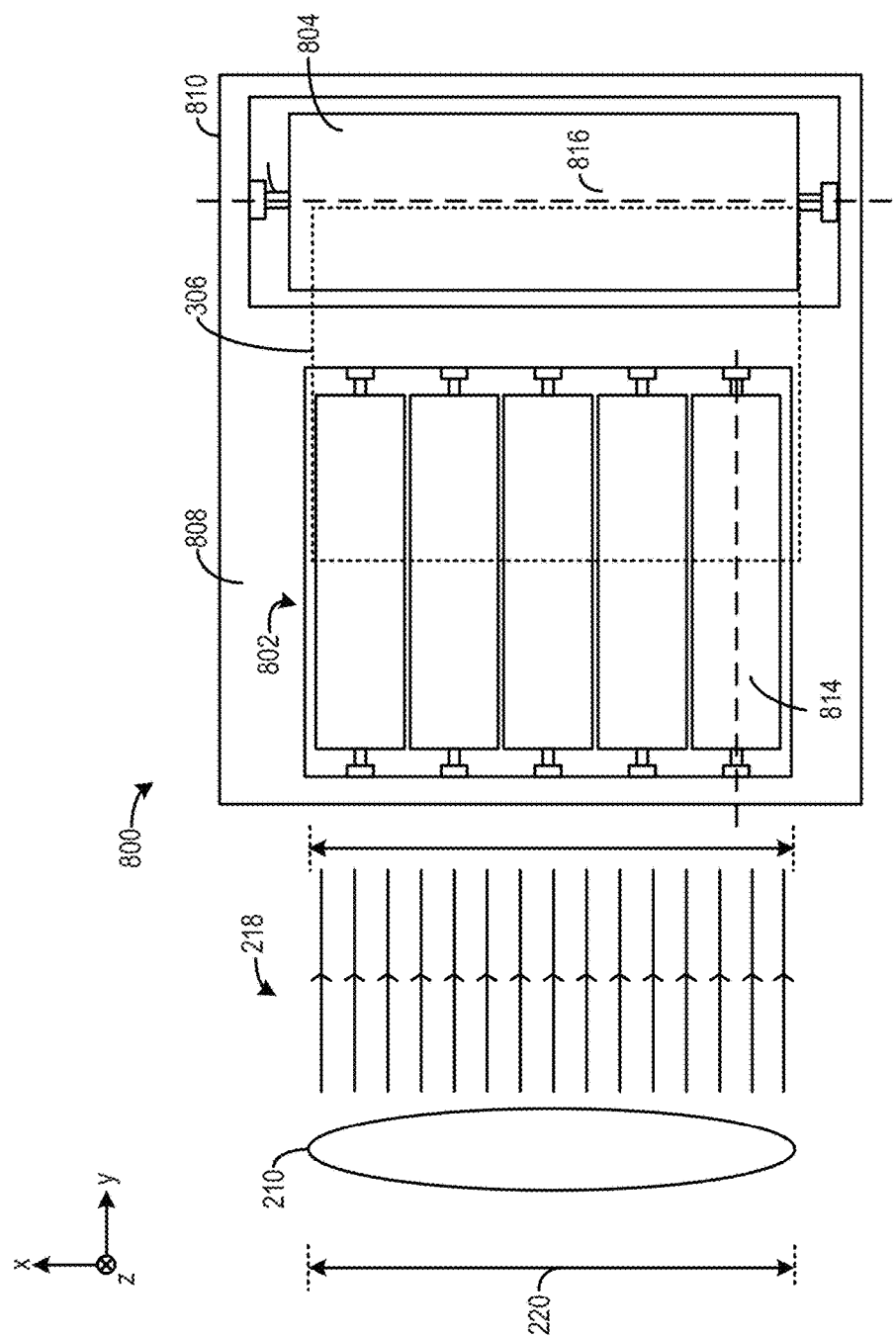
FIG. 8 illustrates another example of a mirror assembly, according to certain embodiments.

In some embodiments, mirror assembly 212 can have a fast axis (e.g., the x-axis) driven with a sinusoidal scanning trajectory and shifting the sample in steps or continuously in a slow axis (e.g., the z-axis) with a sawtooth scanning trajectory or a triangle scanning trajectory. In some embodiments, the fast axis movement can be steered by MEMS devises similar to embodiments disclosed in FIG. 3A, FIG. 5A, FIG. 6 and FIG. 7, and the other axis (the slow axis) movements can be steered by non-MEMS devices such as an analog system (e.g., a system that includes at least one of a galvanometer mirror, a mirror polygon, or flash lens). As the slow axis scanning has a lower requirement for scanning frequency, accuracy and mechanical life, using suitable non-MEMS devices to drive the slow axis scanning can meet the requirement while significantly reducing the complexity and the cost of establishing the mirror assembly. FIG. 8 illustrates another example of a mirror assembly 800, according to embodiments of the present disclosure. Mirror assembly 800 can be part of the light steering system. As shown in FIG. 8, mirror assembly 800 can include an array of first rotatable mirrors 802, a second rotatable mirror 804 and stationary mirror 306. Each of array of first rotatable mirrors 802, second rotatable mirror 804 and stationary mirror 306 can have substantially same mirror surface area and can have dimensions matching the aperture length of lens 210, as in other examples described above. Array of first rotatable mirrors 802 can be MEMS devices implemented on a surface 808 of a semiconductor substrate 810. Second rotatable mirror 804 can be a non-MEMS device such as an analog system (e.g., a galvanometer mirror, a mirror polygon, or flash lens devices) implemented on surface 808 of semiconductor substrate 810. Stationary mirror 306 can be positioned above semiconductor substrate 810. Array of first rotatable mirrors 802 may receive collimated light beam 218 from lens 210, reflect the collimated light beam 218 towards stationary mirror 306, which can in turn reflect collimated light beam 218 towards second rotatable mirror 804. Second rotatable mirror 804 can reflect the collimated light beam 218 received from stationary mirror 306 as output along output projection path 219. Each rotatable mirror of array of first rotatable mirrors 802 is rotatable around a first axis 814, whereas second rotatable mirror 804 is rotatable around a second axis 816 which is different from first axis 814, such as orthogonal to first axis 814. Just as array of first rotatable mirrors 302 of FIG. 3A, the rotation of array of first rotatable mirrors 802 can set an angle of output projection path 219 (or incident light direction 239) with respect to the x-axis, whereas the rotation of second rotatable mirror 804 can set an angle of output projection path 219 (or incident light direction 239) with respect to the z-axis.

Array of first rotatable mirrors 802 and second rotatable mirror 804 can independently change the angle of output projection path 219 (or incident light direction 239) with respect to, respectively, the x-axis and the z-axis, to form a two-dimensional FOV. The rotation of array of first rotatable mirrors 802 and second rotatable mirror 804 can be controlled based on a movement sequence. Similar to the arrangements described in FIG. 4, first dimension control signals can be provided at a relatively high frequency close to the natural frequency of array of first rotatable mirrors 802 to induce harmonic resonance, whereas second dimension control signals can be provided at a relatively low frequency to drive second rotatable mirror 804 as quasi-static loads.

Figure 9:
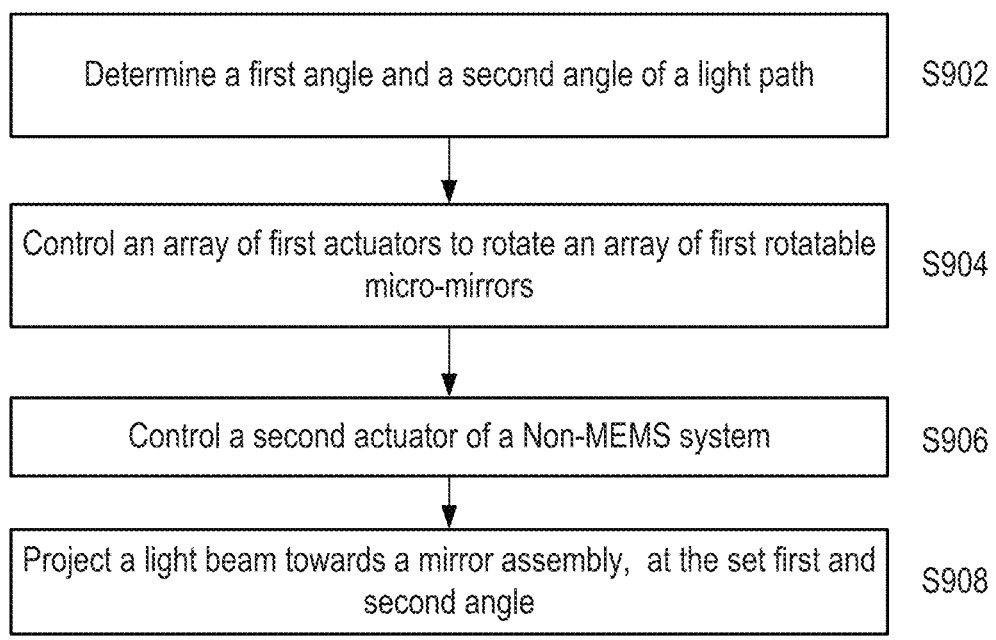
FIG. 9 illustrates a flowchart of a method of operating a mirror assembly, according to embodiments of the disclosure.

FIG. 9 illustrates a flowchart of method of operating a mirror assembly, according to embodiments of the disclosure. FIG. 9 shows a simplified flow diagram of method 900 for performing light steering operation using a mirror assembly, such as mirror assemblies 300, 500, 600, 700 and 800 of FIGS. 3A-FIG. 8. The mirror assembly comprises an array of first rotatable mirrors (e.g., array of first rotatable mirrors 302, array of second rotatable mirrors 504, etc.) and a second rotatable mirror (e.g., second rotatable mirror 304, first rotatable mirror 502, second rotatable mirror 704, etc.). The array of first rotatable mirrors may be part of a MEMS system and the second adjustable mirror may be part of a MEMS system (e.g., in mirror assemblies 300, 500, 600 and 700) or a non-MEMS system (e.g., in mirror assemblies 800) such as an analog system that includes at least one of a galvanometer mirror, a mirror polygon or a flash lens. Method 900 may be performed by a controller, such as LiDAR controller 206.

At operation 902, the controller determines a first angle and a second angle of a light path. In some embodiments, the light path may be one of a projection paths for output light or an input path of input light, the first angle may be with respect to a first dimension and the second angle may be with respect to a second dimension orthogonal to the first dimension. The first angle may be set according to a scanning pattern (e.g., a sinusoidal scanning trajectory along the fast axis) within range 234. The second angle may be set according to the scanning pattern (e.g., sawtooth scanning trajectory or a triangle scanning trajectory along the slow axis) within range 238.

At operation 904, the controller controls an array of first actuators to rotate an array of first rotatable mirrors of the MEMS to set the first angle. The controller may also control the array of first actuators to exert a torque to each rotatable mirror of the array of first rotatable mirrors as a quasi-static load.

At operation 906, the controller controls a second actuator of a MEMS or a non-MEMS system to set the second angle. In some embodiments, the controller may control the second actuator to exert a torque to the second rotatable mirror using a non-MEMS system (e.g., a galvanometer mirror or a polygon mirror). In some other embodiments, the controller may change the mirror within a flash system (e.g., an array of identical mirrors) to move the light beam within range 238 of scanning pattern 232. In some embodiments, the controller may control the second actuator to exert a torque to the second rotatable mirror using a MEMS, similar to rotating the array of first rotatable mirrors of the MEMS to set the first angle.

At operation 908, the controller uses the array of first rotatable mirrors set at the first angle and the second rotatable mirror set at the second angle to perform at least one of: reflecting the output light from the light source along the projection path towards an object or reflecting the input light propagating along the input path to a receiver. For example, the controller may control a light source to project a light beam including a light signal towards the mirror assembly. The light source may include a pulsed laser diode, a source of FMCW signal, a source of AMCW signal, etc. The controller may also use the array of first rotatable mirrors and the second rotatable mirror to direct light signal reflected by the distant object to a receiver and not to direct light signals received at other directions to the receiver.

Figure 10:
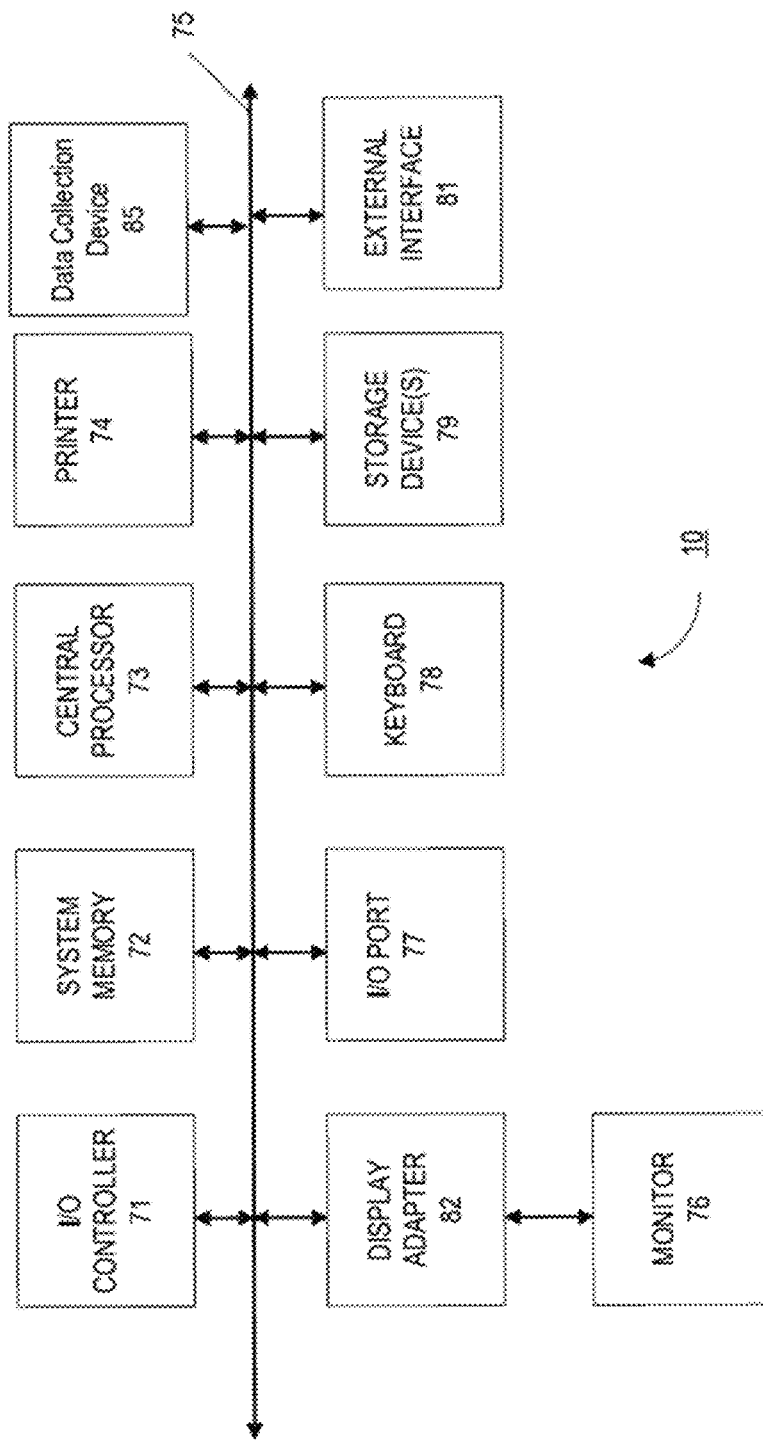
FIG. 10 illustrates an example computer system that may be utilized to implement techniques disclosed herein.

In some embodiments, the mentioned method 900 may be implemented on a computer system utilizing any suitable number of subsystems. Examples of such subsystems are shown in FIG. 10 in computer system 10. In some embodiments, a computer system includes a single computer apparatus, where the subsystems may be the components of the computer apparatus. In other embodiments, a computer system may include multiple computer apparatuses, each being a subsystem, with internal components. A computer system may include desktop and laptop computers, tablets, mobile phones and other mobile devices. In some embodiments, a cloud infrastructure (e.g., Amazon Web Services), a graphical processing unit (GPU), etc., may be used to implement the disclosed techniques, including the techniques described from FIG. 1-FIG. 9. For example, computer system 10 may be used to implement the functionality of LiDAR controller 206 and to perform the operations of method 900.

The subsystems shown in FIG. 10 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, may be connected to the computer system by any number of means known in the art such as input/output (I/O) port 77 (e.g., USB, FireWire®). For example, I/O port 77 or external interface 81 (e.g. Ethernet, Wi-Fi, etc.) may be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein may be output from one component to another component and may be output to the user.

A computer system may include a plurality of the same components or subsystems, e.g., connected together by external interface 81 or by an internal interface. In some embodiments, computer systems, subsystem, or apparatuses may communicate over a network. In such instances, one computer may be considered a client and another computer a server, where each may be part of a same computer system. A client and a server may each include multiple systems, subsystems, or components.

Aspects of embodiments may be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium may include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

In some embodiments, LiDAR system 102 may have a semi-coaxial LiDAR structure where the system uses a MEMS system for one-dimension scanning, as part of the transmitting system, and a mechanical system for another dimension scanning (e.g., a dimension orthogonal to the first dimension scanning) that shares a motor with a receiving aperture of the receiving system. For example, light may be first steered by a MEMS scanner in x-axis direction, and then be scanned by a galvo system in y-axis direction orthogonal to x-axis direction, in a cascaded fashion. Light reflected by an object may be de-scanned in y-axis direction by the receiving aperture rotated by the same galvo system. The reflected light may then be collected by detectors (e.g., a detector array).

By combining only one-dimension scanning of the transmitting system with the receiving system, the mechanical part of the transmitting system can scan at a relatively low rate (e.g., 10 Hz) and thus reduce the power consumption and increase the lifetime and reliability of the system. Also, the size of the mirror aperture of the mechanical part can be larger than the mirror aperture of the MEMS system because of the relatively low scanning rate. Moreover, for future improving the LiDAR system's performance purpose, the size of the mirror aperture of the mechanical system can also further be extended. In some embodiments, silicon (Si) may be used for building structures that drive the mirror for the high frequency axial scanning. For example, silicon (Si) may be used for building structures that drive the MEMS system. Because Si made structures have a much higher fatigue resistance comparing to metal made structures, using Si for building structures that drive the high frequency axial scanning may significantly extend the lifetime of the scanning structure. Also, using Si may increase the system's magnetism resistance, temperature stability, overall reliability and reduce the weight, and the power consumption, it is suitable for the fast axis scanning. However, due to the manufacturing restrictions, the scale of the MEMS system cannot be larger than a few centimeters (e.g., around 5 centimeters), using a mechanical system to combine with the MEMS system for both transmitting and receiving (e.g., the semi-coaxial structure scanning system) may greatly increase the size of the transmitting and receiving apertures and the mechanical stability of the system. Larger receiving apertures may increase the signal-to-noise ratio (SNR), detection distance, probability of detection (e.g., more than 80% for the systems disclosed in details in FIGS. 11 and 12), reduce the false acceptance rate (e.g., reduce the possibility of false detection of non-existence object) and increase the precision of the measuring system. Also, the detection SNR, probability of detection, and detection distance can be further increased by increasing the aperture of the mechanical scanner's size, which makes the system specification expandable. As a result, by semi-coaxial the MEMS system and the mechanical system (e.g., using the MEMS system with high a fatigue resistance but smaller aperture size to scan the high frequency scanning direction, and using the mechanical system with larger apertures size to scan and de-scan the low frequency scanning direction), the semi-coaxial system may benefit from both systems' advantages while overcoming the shortcomings of each individual system.

Figure 11:
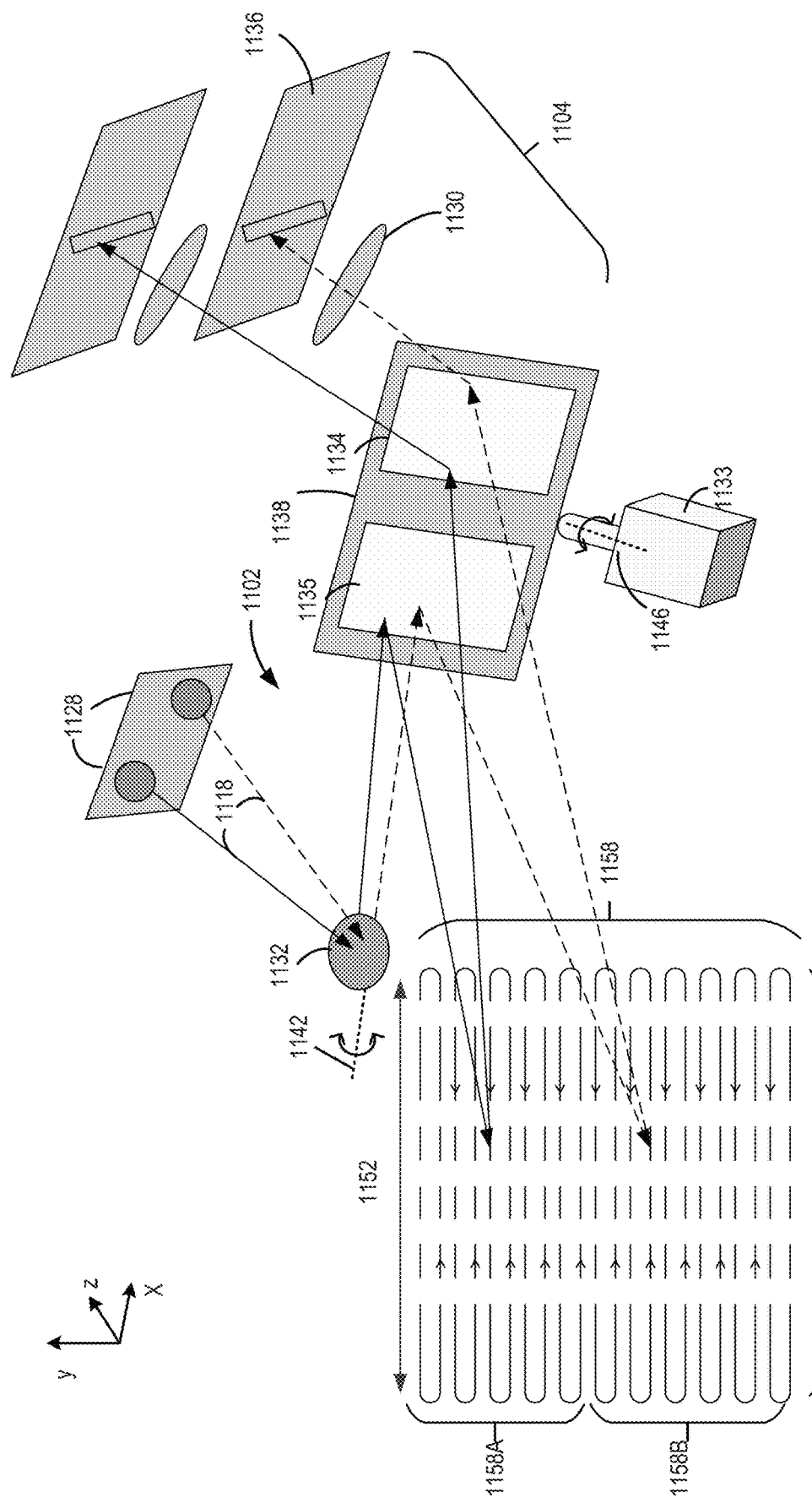
FIG. 11 illustrates another example of a light steering system, according to certain embodiments.

FIG. 11 illustrates examples of internal components of an embodiment of LiDAR system 102. LiDAR system 102 includes a transmitting system 1102 (a transmitter), a receiving system 1104 (a detector), controllers (not shown) which control the operations of transmitting system 1102 and receiving system 1104 respectively. Transmitting system 1102 includes a light source 1128, a first mirror rotated by a MEMS system 1132, a second mirror 1135 and in some embodiments, a collimator lens (not shown). In some embodiments, light source 1128 may be at least one of pulsed laser diode, source of FMCW signal, or AMCW signal, etc. Receiving system 1104 includes a receiving aperture 1134, collimator lens 1130 and a photodetector 1136. LiDAR system 102 further includes, a substrate 1138 rotated by a motor 1133 where second mirror 1135 and receiving aperture 1134 are placed on substrate 1138 at a first distance. The first mirror and second mirror 1135 are placed in a second distance where the first distance and the second distance are set in a manner that receiving aperture 1134 may receive the light beam emitted by light source 1128, reflected by the first mirror of MEMS system 1132 and objects to be scanned. In some embodiments, LiDAR system 102, transmitting system 1102 and receiving system 1104 can be configured as a semi-coaxial system to share only one dimension of scanning and de-scanning (e.g., in x direction as shown in FIG. 11) to perform light steering operation. In some embodiments, second mirror 1135 and receiving aperture 1134 may be a combined aperture. For example, substrate 1138 may include only one aperture 1134 that is used for both reflecting the light beam emitted by light source 1128 and receiving the light beam reflected by the object to be scanned.

MEMS system 1132 may include one or more rotatable mirrors. FIG. 11 illustrates MEMS system 1132 as having one mirror. In some embodiments, MEMS system 1132 may include a plurality of mirrors. In one example, the mirror aperture of MEMS system 1132 may be a 1 mm×10 mm pulsed laser diode with a +/−3.75° mechanical tilt. In some embodiments, MEMS system 1132 may be rotated at a frequency close to the natural frequency of the rotatable mirror. For example, for forming a 45° horizontal FOV, the resonant frequency may be set as 5 kHz. For forming a 60° horizontal FOV, the resonant frequency may be set as 6.7 kHz. For forming a 75° horizontal FOV, the resonant frequency may be set as 8 kHz. In some embodiments, the required torque for rotating the mirror may be less than 0.5 u Nm.

In some embodiments, MEMS system 1132 and motor 1133 further both include an actuator (not shown in FIG. 11) to rotate the rotatable mirrors. In some embodiments, the actuators are controlled by controllers that the light beam transmitted from the transmitting system may form a FOV 1152. In some embodiments, MEMS system 1132 can rotate the first rotatable mirror around a first axis 1142 to change a first angle of output light beams 1118 with respect to a first dimension (e.g., the y-axis). Motor 1133 can rotate second mirror 1135 and receiving aperture 1134 around a second axis 1146 to set a second angle with respect to a second dimension (e.g., the x-axis). The controllers can control the actuators to produce different combinations of angles of rotation around first axis 1142 and second axis 1146 such that the movement of output light beams 1118 can follow scanning pattern corresponding to FOV 1152. A range 1154 of movement of output light beams 1118 along the x-axis, as well as a range 1158 of movement of output light beams 1118 along the y-axis, can define a FOV. An object within the FOV, can receive and reflect output light beams 1118 to form a reflected light signal, which can be received by receiving system 1104.

In some embodiments, light source 1128 may include more than one light sources, such that transmitting system 1102 may form a split FOV. For example, as shown in FIG. 11, light source 1128 may include two pulsed laser diodes (PLDs) that can generate output light 1118 that includes two respective light beams. By adjusting the two respective light beams using transmitting system 1102, a split FOV 1158A and 1158B may be formed. For example, output light 1118 from one of the two PLD may be steered by MEMS system 1132 onto the angle from −23 degrees to −10.5 degrees, and output light 1118 from the other PLD may be steered onto the angle from −10.5 degrees to 3.5 degrees. The full covering range may be 26.5 degrees in y-axis. Thus, as a result, MEMS system 1132 may need to rotate in a smaller range to form the same range of FOV as if split FOV is not used. This may further reduce the power consumption, the torque needed for rotating the mirror and thus increase the lifetime of the MEMS system.

In some embodiments, two detectors (e.g., photodetector 1136 may include two detector arrays) may be used to receive the two output light beams emitted by the two light sources respectively. In some embodiments, the number of detector arrays in detectors (e.g., photodetector 1136) may be the same as the number of light sources 1128. In some embodiments, the detectors may be two arrays of avalanche photodiodes (APD) that are aligned with the two PLDs respectively. In some embodiments, the receiver of each detector within the detector array may has a small angle of view (e.g., less than few centimeters) such that the signal to noise ratio of receiving system 1104 may be increased.

In some embodiments, LiDAR system 102 may has a spinning structure where the system uses a MEMS system for one-dimension scanning, as part of the transmitting system, and where the MEMS system is rotated along with the receiving system by a motor in another dimension orthogonal to the first dimension. For example, light may be first steered by a MEMS scanner in x-axis direction, and then be scanned by a galvo system in y-axis direction orthogonal to x-axis direction, in a cascaded fashion. Light reflected by an object may be de-scanned in y-axis direction with a receiving aperture. The reflected light may then be collected by one or more detectors (e.g., detector array).

Figure 12:
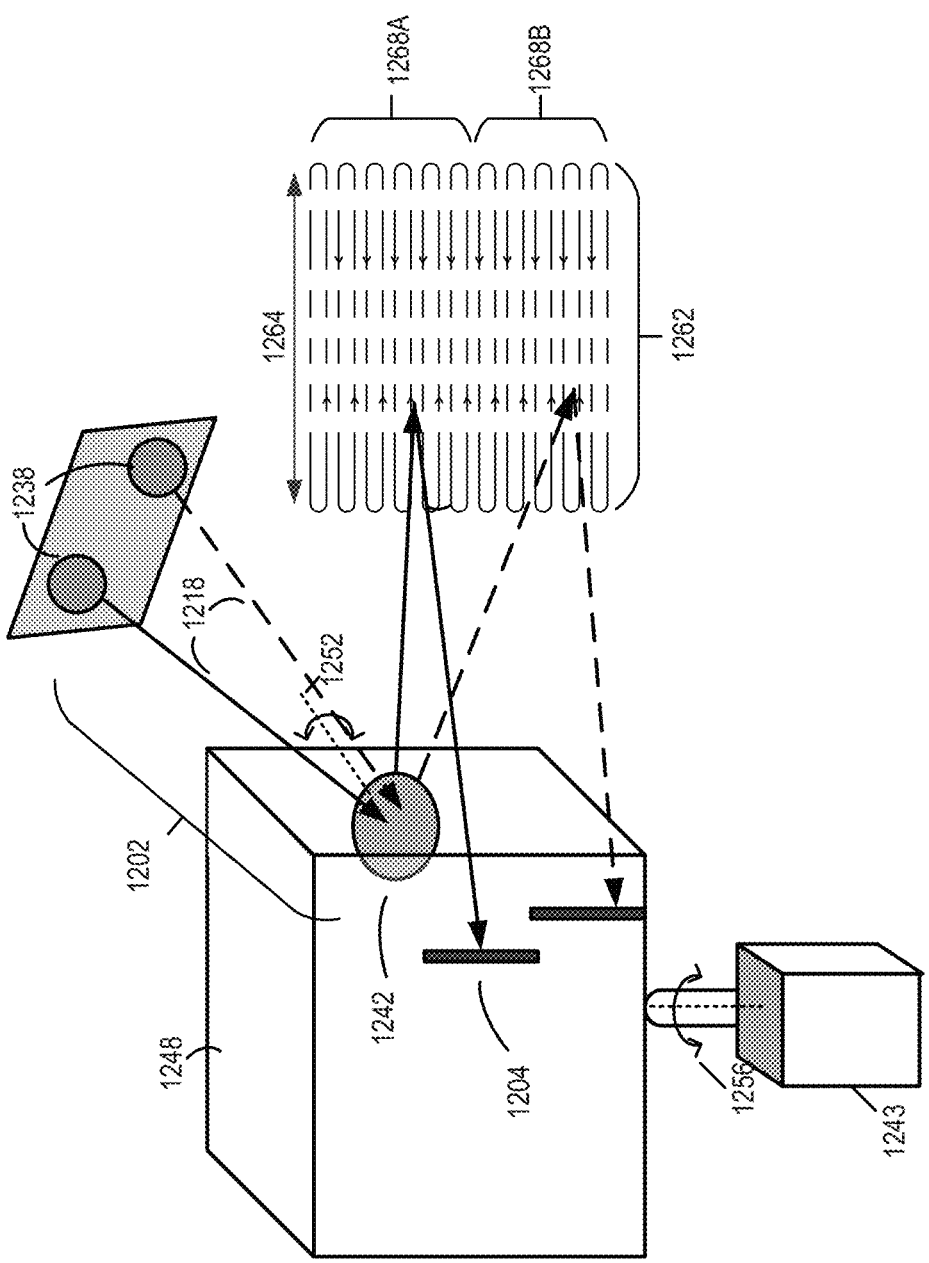
FIG. 12 illustrates another example of a light steering system, according to certain embodiments.

FIG. 12 illustrates examples of internal components of an embodiment of LiDAR system 102. LiDAR system 102 includes a transmitting system 1202 (a transmitter), a receiving system 1204 (a detector), a controller (not shown) which controls the operations of transmitting system 1202 and receiving system 1204 respectively. Transmitting system 1202 includes a light source 1238, a mirror rotated by a MEMS system 1242 and in some embodiments, a collimator lens (not shown). In some embodiments, light source 1238 may be at least one of pulsed laser diode, source of FMCW signal, or AMCW signal, etc. Receiving system 1204 includes a receiving aperture (not shown), collimator lens (not shown) and a photodetector (not shown). LiDAR system 102 further includes, a substrate 1248 rotated by a motor 1243 where MEMS system 1242 and receiving system 1204 are placed on substrate 1248 at a first distance. Light source 1238 and substrate 1248 are placed in a second distance where the first distance and the second distance are set in a manner that receiving system 1204 may receive the light beam emitted by light source 1238 and reflected by MEMS system 1242 and objects to be scanned. In some embodiments, transmitting system 1202 and receiving system 1204 can be configured as one spinning system where MEMS system 1242 scans in one dimension while spinning along with receiving system 1204 in another dimension at the same time.

MEMS system 1242 may include one or more rotatable mirrors. FIG. 12 illustrates MEMS system 1242 as having one mirror. In some embodiments, MEMS system 1242 may include a plurality of mirrors. In one example, the mirror aperture of MEMS system 1242 may be a 1 mm×10 mm pulsed laser diode with a +/−3.75° mechanical tilt. In some embodiments, MEMS system 1242 may be rotated at a frequency close to the natural frequency of the rotatable mirror. For example, for forming a 45° horizontal FOV, the resonant frequency may be set as 5 kHz. For forming a 60° horizontal FOV, the resonant frequency may be set as 6.7 kHz. For forming a 75° horizontal FOV, the resonant frequency may be set as 8 kHz. In some embodiments, the required torque for rotating the mirror may be less than 0.5 u Nm.

In some embodiments, MEMS system 1242 and motor 1243 further both include an actuator (not shown) to rotate the rotatable mirror and substrate 1248, respectively. In some embodiments, the actuators are controlled by one or more controllers that the light beam transmitted from the transmitting system may form a FOV 1262. In some embodiments, MEMS system 1242 can rotate the rotatable mirror around a first axis 1252 to change a first angle of output light beams 1218 with respect to a first dimension (e.g., the y-axis). Motor 1243 can rotate MEMS system 1242 and receiving system 1204 around a second axis 1256 with respect to a second angle in a second dimension (e.g., the x-axis). The controllers can control the actuators to produce different combinations of angles of rotation around first axis 1252 and second axis 1256 such that the movement of output light beams 1218 can follow scanning pattern corresponding to FOV 1262. A range 1264 of movement of output light beams 1218 along the x-axis, as well as a range 1268 of movement of output light beams 1218 along the y-axis, can define a FOV. An object within the FOV, can receive and reflect output light beams 1218 to form a reflected light signal, which can be received by receiving system 1204.

In some embodiments, light source 1238 may include more than one light source to form a split FOV. For example, as shown in FIG. 12, light source 1238 may include two PLDs that can generate output light beams 1218 that include two respective light beams. By adjusting the two respective light beams using transmitting system 1202, a split FOV 1268A and 1268B may be formed. For example, output light 1218 from one of the two PLD may be steered by MEMS system 1232 onto the angle from −23 degrees to −10.5 degrees, and output light 1218 from the other PLD may be steered onto the angle from −10.5 degrees to 3.5 degrees. The full covering range may be 26.5 degrees in y-axis. Thus, as a result, MEMS system 1232 may need to rotate in a smaller range to form the same range of FOV as if split FOV is not used.

In some embodiments, two detectors (as shown in FIG. 12) may be used to receive the two output light beams emitted by the two light sources respectively. In some embodiments, the detectors may be two arrays of APD that are aligned with the two PLD respectively.

Figure 13:
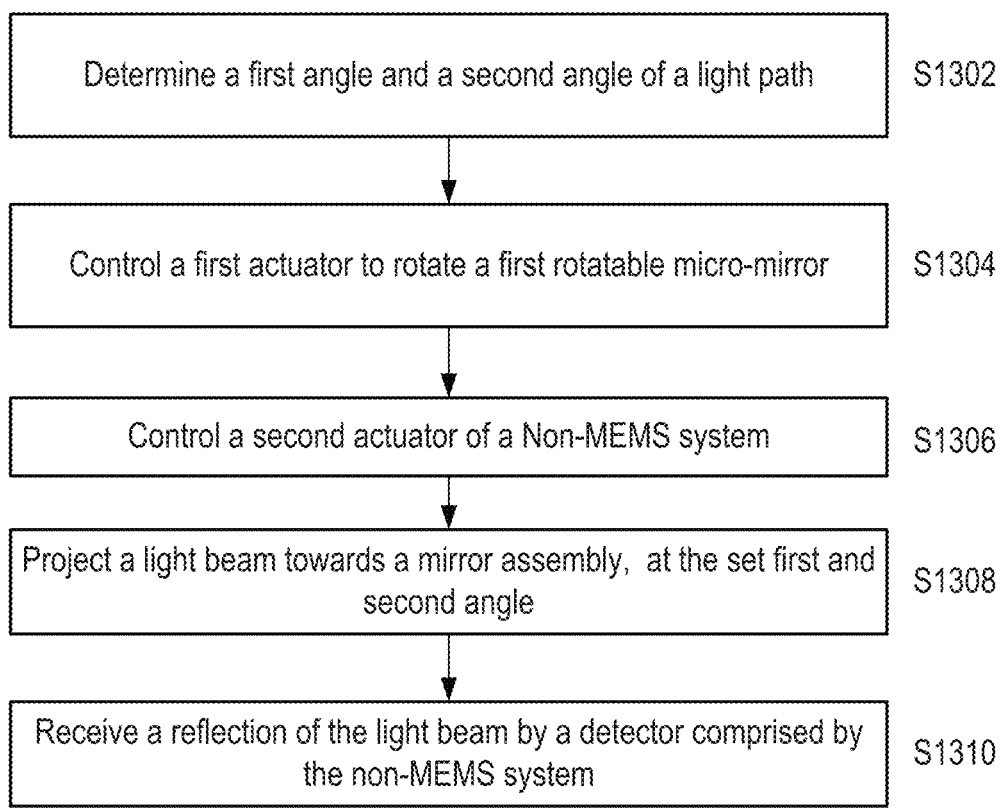
FIG. 13 illustrates a flowchart of method of operating a mirror assembly, according to embodiments of the disclosure.

FIG. 13 illustrates a flowchart of method of operating a mirror assembly, according to embodiments of the disclosure. FIG. 13 shows a simplified flow diagram of method 1300 for performing light steering operation using a LiDAR system 102, such as LiDAR systems shown in FIG. 11 and FIG. 12.

At operation 1302, a controller determines a first angle and a second angle of a light path. In some embodiments, the light path may be one of a projection paths for output light or an input path of input light, the first angle may be with respect to a first dimension and the second angle may be with respect to a second dimension orthogonal to the first dimension. The first angle may be set according to a scanning pattern (e.g., a sinusoidal scanning trajectory along the fast axis). The second angle may be set according to the scanning pattern (e.g., sawtooth scanning trajectory or a triangle scanning trajectory along the slow axis).

At operation 1304, the controller controls a first actuator to rotate a first rotatable mirror of the MEMS to set the first angle. The controller may also control the first actuator to exert a torque to the first rotatable mirror as a quasi-static load.

At operation 1306, the controller controls a non-MEMS system to set the second angle. In some embodiments, the controller may control the second actuator to exert a torque to a second rotatable mirror using a non-MEMS system (e.g., a galvanometer mirror or a polygon mirror). In some other embodiments, the controller may change the mirror within a flash system (e.g., an array of identical mirrors) to move the light beam within the scanning pattern. In some embodiments, the controller may control the second actuator to exert a torque to the second rotatable mirror using a MEMS, similar to control the first rotatable mirror of the MEMS to set the first angle. In some embodiments, the controller may control a motor where the MEMS system is mounted to set the second angle.

At operation 1308, the controller uses the first rotatable mirror set at the first angle and the second actuator to set at the second angle to perform at least one of: reflecting the output light from the light source along the projection path towards an object or reflecting the input light propagating along the input path to a receiver. For example, the controller may control a light source to project a light beam including a light signal towards the mirror assembly. The light source may include a pulsed laser diode, a source of FMCW signal, a source of AMCW signal, etc.

At operation 1310, the controller controls a detector to receive a reflection of the light beam, reflected by a distant object. For example, an object within a FOV may be detected by reflecting the light beam back to the detector and the detector is aligned with MEMS system such that the detector can receive the reflected light.

In some embodiments, LiDAR system 102 may have a full-coaxial LiDAR structure where the system uses a MEMS system for one-dimension scanning, as part of the transmitting system, and a mechanical system for another dimension scanning (e.g., a dimension orthogonal to the first dimension scanning). The apertures of the MEMS system may also be used as receiving apertures of the receiving system. For example, light may be first steered by a MEMS scanner in the x-axis direction, and then be scanned by a mechanical system (e.g., a galvo system, polygon, flash or rotating mechanical scanner) in the y-axis direction orthogonal to the x-axis direction, in a cascaded fashion. Light reflected by an object may be de-scanned in by the MEMS scanner's apertures which are used as receiving aperture rotated by the same MEMS system. The reflected light may then be collected by detectors (e.g., an avalanche photodiode (APD) or a single-photon avalanche diode (SPAD)).

Figure 14:
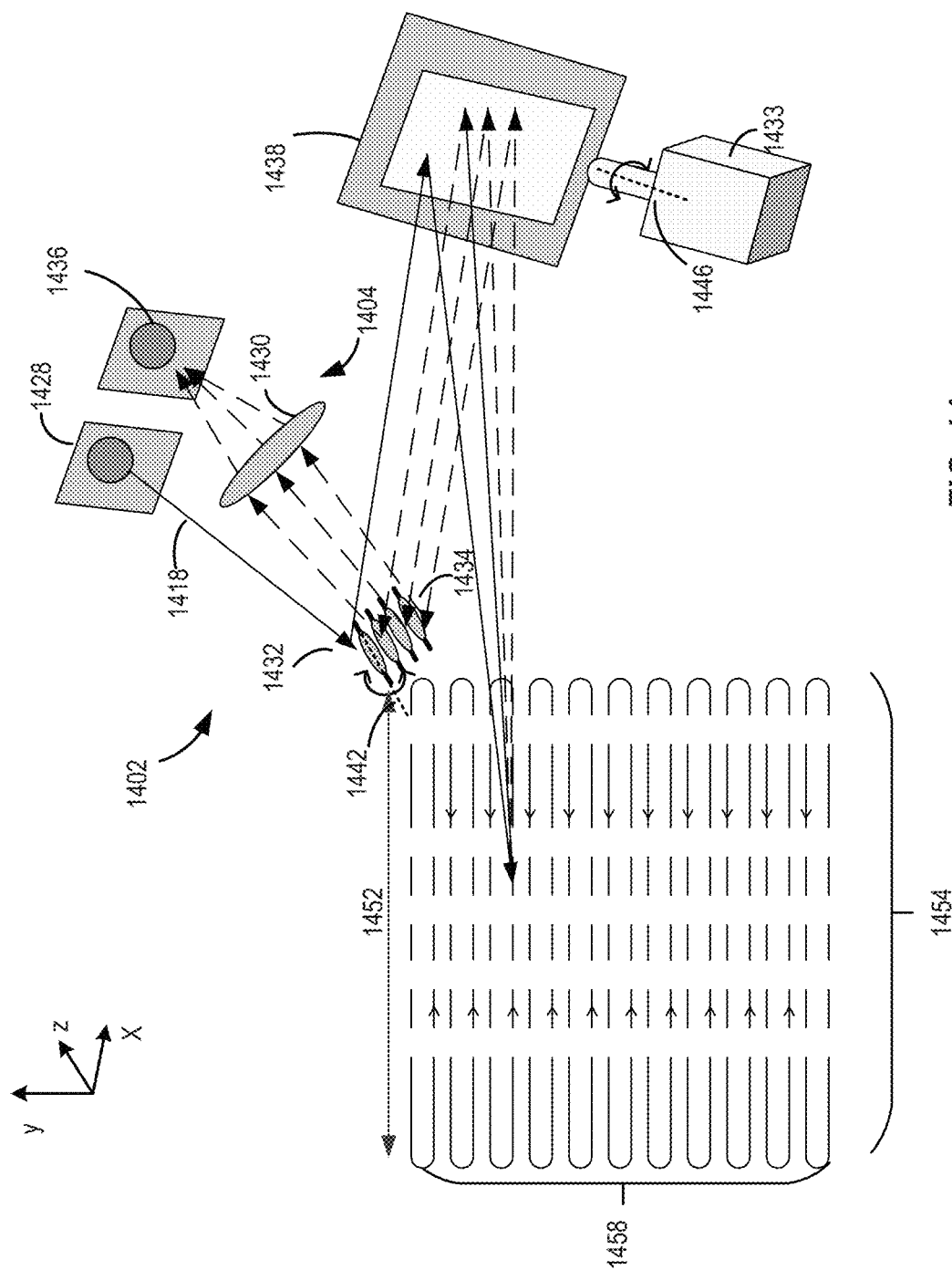
FIG. 14 illustrates another example of a light steering system, according to certain embodiments.
Figure 15:
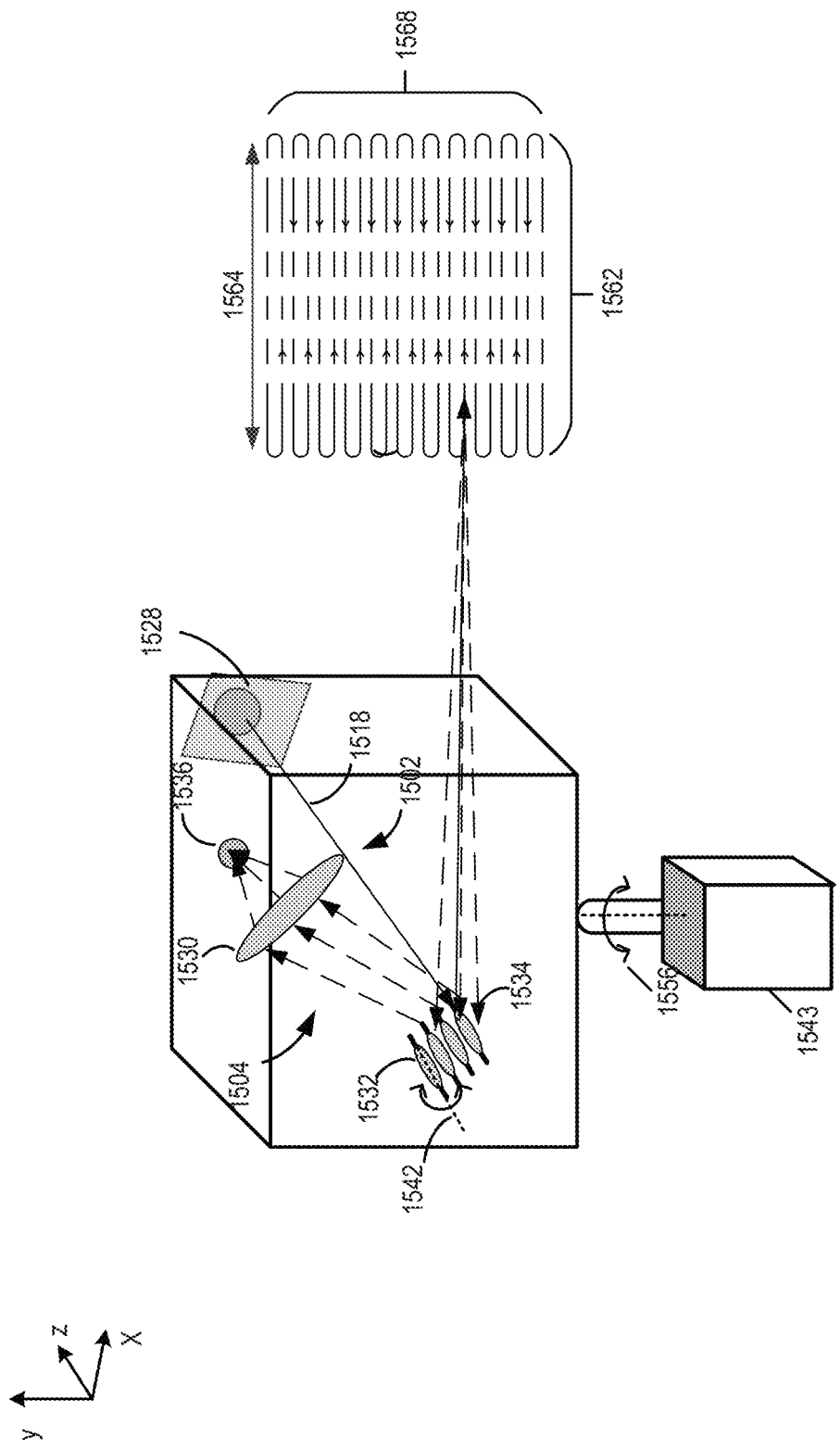
FIG. 15 illustrates another example of a light steering system, according to certain embodiments.

In some embodiments, the MEMS system may include a rotatable mirror array that includes more than one rotatable micro-mirrors (e.g., the systems disclosed in detail in FIGS. 14 and 15). For example, light may be first steered by at least one of the micro-mirrors of the rotatable mirror array of the MEMS scanner in x-axis direction, and then be scanned by a mechanical system (e.g., a galvo system, polygon, flash or rotating mechanical scanner) in the y-axis direction orthogonal to the x-axis direction, in a cascaded fashion (e.g., the system disclosed in FIG. 14) or at the same time (e.g., the system disclosed in FIG. 15). Light reflected by an object may be de-scanned by the rotatable mirror array of the MEMS scanner which are used as receiving aperture rotated by the same MEMS system. The reflected light may then be collected by the detector. In some other embodiments, the MEMS system may also include a single rotatable mirror to first steered the light in x-axis direction (e.g., the systems disclosed in detail in FIGS. 17 and 18). The light may then be scanned by a mechanical system (e.g., a galvo system, polygon, flash or rotating mechanical scanner) in the y-axis direction orthogonal to the x-axis direction, in a cascaded fashion (e.g., the system disclosed in FIG. 17) or at the same time (e.g., the system disclosed in FIG. 18). Light reflected by an object may be de-scanned by the single rotatable mirror of the MEMS scanner which are used as receiving aperture rotated by the same MEMS system. The reflected light may then be collected by the detector.

In some embodiments, Si may be used for structures that drive the mirror for the high-frequency axial scanning. Using Si for building structures that drive the mirror for the high-frequency axial scanning may achieve great benefits. For example, Si may be used for building structures that drive the MEMS system. Because Si made structures have a much higher fatigue resistance comparing to metal made structures, using Si for building structures that drive the high-frequency axial scanning may significantly extend the lifetime of the scanning structure. Also, using Si may increase the system's magnetism resistance, temperature stability, overall reliability and reduce the weight, and the power consumption. Thus, Si made structures is suitable for the fast-axis scanning.

However, due to the manufacturing restrictions, the scale of the MEMS system cannot be larger than a few centimeters (e.g., around 5 centimeters), the size a single aperture made by Si cannot be large enough for receiving enough light beams reflected by an object. Using an rotatable micro-mirror array (e.g., a rotatable MEMS mirror array) as the receiving apertures may greatly extend the size of the receiving aperture and thus greatly increase the signal-to-noise ratio (SNR), detection distance, probability of detection (e.g., more than 80% for the systems disclosed in detail in FIGS. 14 and 15), reduce the false acceptance rate (e.g., reduce the possibility of false detection of non-existence object) and increase the precision of the measuring system. For example, the detection SNR, probability of detection, and detection distance can be increased by increasing the number of rotatable micro-mirrors in the rotatable micro-mirror array. As the number of rotatable micro-mirrors in the rotatable micro-mirror array can be increased, the system specification is expandable and thus the system is capable for making further improvement (e.g., be used for detecting objects in a longer distance, with higher location accuracy requirement, etc.).

In some embodiments, a collimator lens may be disposed between the receiving aperture and the detector. Light beams reflected by the receiving aperture may be narrowed (e.g., more aligned towards the detector). In some embodiments, the distance between the collimator and detector may be determined such that the light beam de-scanned and reflected by the receiving aperture may be focused to the point where the detector is positioned. As a result, the LiDAR system may only need one avalanche photodiode (APD) or a single-photon avalanche diode (SPAD) be used as the detector. Using one APD or SPAD as the detector may greatly reduce the complexity of aligning the detector with the receiving apertures. (e.g., less degree of freedom needs to be adjusted when using one APD as a detector). Moreover, using only one APD or SPAD as a detector may also greatly reduce the overall size of the LiDAR system and as a result further reduce the cost for establishing the LiDAR scanning system.

FIG. 14 illustrates examples of internal components of an embodiment of LiDAR system 102. LiDAR system 102 may include a transmitting system 1402 (a transmitter) and a receiving system 1404 (a detector). In some embodiments, transmitting system 1402 may include a light source 1428, a transmitting aperture 1432, and a rotatable mirror 1438. Receiving system 1404 may include receiving aperture 1434, detector 1436 and a collimator lens 1430 that narrows the light beams reflected by receiving aperture 1434 (e.g., more aligned towards detector 1436). In some embodiments, LiDAR system 102 may also include a controller (not shown) which controls the operations of transmitting system 1402 and receiving system 1404 respectively.

In some embodiments, light source 1428 may be at least one of a pulsed laser diode, a source of FMCW signal, or AMCW signal, etc. In some embodiments, transmitting aperture 1432 may share apertures with receiving aperture 1434. For example, transmitting aperture 1432 may be a rotatable mirror array rotatable in a first dimension (e.g., one of a rotatable micro-mirror in a rotatable MEMS mirror array rotatable around axis 1442 as shown in FIG. 14 for both scanning and de-scanning) and receiving aperture 1434 may also be the same rotatable MEMS mirror array. As the aperture size of receiving aperture 1434 may be expended (e.g., increase the number of rotatable micro-mirror in the same rotatable MEMS mirror array), the size of receiving aperture 1434 may ensure a predetermined level of detected signal's signal-to-noise ratio (SNR), the probability of detection (PD), detection distance (the distance between the object to be detected and the LiDAR system), and may reduce the false acceptance rate (incorrectly detect objects that should not be detected) and increase the system's precision (the accuracy of the detect location of the detected object) to a certain level.

In some embodiments, LiDAR system 102 may further include a mechanical system 1433 that rotates rotatable mirror 1438 in a second dimension, orthodox to the first dimension (e.g., around axis 1446 as shown in FIG. 14) to perform scanning. For example, mechanical system 1433 may be driven by at least one of a comb drive, a piezoelectric device, or an electromagnetic device or rotatable mirror 1438 may be at least one of a galvanometer mirror, a mirror polygon, a rotating mechanical scanner, or a spinning system. In some embodiments, detector 1436 may be an avalanche photodiode (APD) or a single-photon avalanche diode (SPAD) positioned behind collimator lens 1430.

The MEMS mirror array shared by transmitting aperture 1432 and receiving aperture 1434 may include one or more rotatable micro-mirrors. FIG. 14 illustrates the MEMS mirror array as having four rotatable micro-mirrors. In some embodiments, the rotatable MEMS mirror array may include a plurality of mirrors that is more than or less than four rotatable micro-mirrors (e.g., three or five, two or six rotatable micro-mirrors). In one example, the mirror aperture of each of the micro-mirror in the rotatable MEMS mirror array may be a 1 mm×10 mm pulsed laser diode with a +/−3.75° mechanical tilt. In some embodiments, the MEMS mirror array may be rotated at a frequency close to the natural frequency of each of the rotatable micro-mirror in the rotatable MEMS mirror array. For example, for forming a 45° horizontal FOV, the resonant frequency may be set at 5 kHz. For forming a 60° horizontal FOV, the resonant frequency may be set at 6.7 kHz. For forming a 75° horizontal FOV, the resonant frequency may be set at 8 kHz.

In some embodiments, the required torque for rotating the mirror may be less than 0.5 u Nm.

In some embodiments, the MEMS mirror array and mechanical system 1433 may further both include an actuator (not shown in FIG. 14) to rotate the rotatable mirrors. In some embodiments, the actuators are controlled by controllers that the light beam transmitted from the transmitting system may form a FOV 1452. In some embodiments, the rotatable MEMS mirror array can rotate the each of the rotatable micro-mirror around a first axis 1442 to change a first angle of an output light beam 1418 with respect to scan a first dimension (e.g., the y-axis in FOV 1452). Mechanical system 1433 can rotate rotatable mirror 1435 around a second axis 1446 to set a second angle with respect to a second dimension (e.g., the x-axis). The controllers can control the actuators to produce different combinations of angles of rotation around first axis 1442 and second axis 1446 such that the movement of output light beam 1418 can follow scanning pattern corresponding to FOV 1452. A range 1454 of movement of output light beam 1418 along the x-axis, as well as a range 1458 of movement of output light beam 1418 along the y-axis, can define a FOV. An object within the FOV, can receive and reflect output light beam 1418 to form a reflected light signal, which can be received by receiving system 1404.

In some embodiments, a collimator lens 1430 that narrows the light beams reflected by receiving aperture 1434 (e.g., more aligned towards detector 1436) may be positioned between receiving aperture 1434 and detector 1436. For example, the distance between collimator lens 1430 and detector 1436 may be determined such that the light beam de-scanned and reflected by receiving aperture 1434 may be focused to the point where detector 1436 is positioned. Because the de-scanned light is now focused to a point comparing to a line where an array of detectors is needed for receiving the de-scanned light, the complexity of alignment is significantly reduced (e.g. the degree of freedom to be aligned is reduced because no freedom of rotation needs to be considered). The reduction in complexity of alignment may result in reduced cost of installation of the LiDAR system.

In some embodiments, detector 1436 may be an avalanche photodiodes (APD) or a single-photon avalanche diode (SPAD). In some embodiments, the receiver of detector 1436 may have a small angle of view (e.g., less than a few centimeters) such that the signal to noise ratio of receiving system 1404 may be increased.

Figure 17:
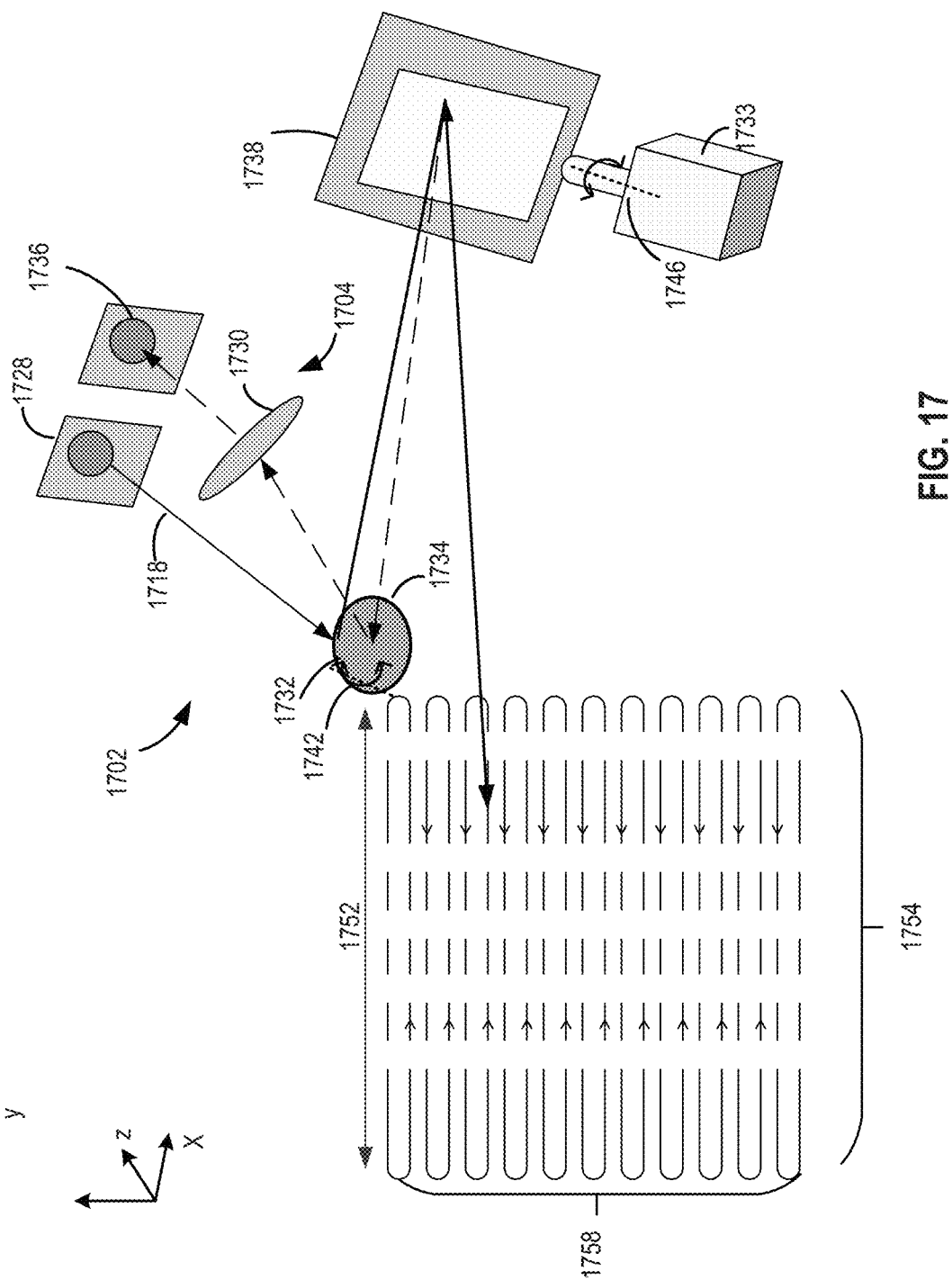
FIG. 17 illustrates another example of a light steering system, according to certain embodiments.

FIG. 17 illustrates examples of internal components of an embodiment of LiDAR system 102, similar to the LiDAR system illustrated in FIG. 14. LiDAR system 102 may include a transmitting system 1702 (a transmitter) and a receiving system 1704 (a detector). In some embodiments, transmitting system 1702 may include a light source 1728, a transmitting aperture 1732, and a rotatable mirror 1738. Receiving system 1704 may include receiving aperture 1734, and detector 1736. In some embodiments, receiving system 1704 may also include a collimator lens 1730 that narrows the light beams reflected by receiving aperture 1734 (e.g., more aligned towards detector 1736). In some embodiments, LiDAR system 102 may also include a controller (not shown) which controls the operations of transmitting system 1702 and receiving system 1704 respectively. LiDAR system 102 may further include a mechanical system 1733 that rotates rotatable mirror 1738 in a second dimension, orthodox to the first dimension (e.g., around axis 1746 as shown in FIG. 17) to perform scanning. In some embodiments, a collimator lens 1730 that narrows the light beams reflected by receiving aperture 1734 (e.g., more aligned towards detector 1736) may be positioned between receiving aperture 1734 and detector 1736.

Different from the LiDAR system illustrated in FIG. 14, the aperture shared by transmitting aperture 1732 and receiving aperture 1734 may maybe a single rotatable mirror. For example, transmitting aperture 1732 may be a single rotatable mirror rotatable in a first dimension (e.g., a single rotatable mirror driven by a MEMS system, rotatable around axis 1742 as shown in FIG. 17 for both scanning and de-scanning) and receiving aperture 1734 may also be the same single rotatable MEMS mirror (i.e., using the same rotatable mirror as both transmitting aperture 1732 and receiving aperture 1734). The other internal components may be the same or similar to the counterpart components in the LiDAR system illustrated in FIG. 14. For ease of illustration, same or similar components illustrated in FIG. 14 are not repeated in the description.

In some embodiments, LiDAR system 102 may have a spinning structure where the system uses a MEMS system for one-dimension scanning, both as part of the transmitting system and receiving system, and where the MEMS system is rotated along with a mechanical in another dimension orthogonal to the first dimension. For example, light may be first steered by a MEMS scanner in the x-axis direction, and then be scanned by the mechanical system (e.g. a galvo system, polygon, flash or rotating mechanical scanner), in the y-axis direction orthogonal to x-axis direction, in a cascaded fashion. In some embodiments, the MEMS system is mounted on the mechanical system. Light reflected by an object may be de-scanned in they-axis direction with a receiving aperture. The reflected light may then be collected by one or more detectors (e.g., detector array).

FIG. 15 illustrates examples of internal components of an embodiment of LiDAR system 102. LiDAR system 102 may include a transmitting system 1502 (a transmitter) and a receiving system 1504 (a detector). In some embodiments, transmitting system 1502 may include a light source 1528, a transmitting aperture 1532, and a mechanical system 1543. Receiving system 1504 may include receiving aperture 1534, detector 1536 and a collimator lens 1530 that narrows the light beams reflected by receiving aperture 1534 (e.g., more aligned towards detector 1536). In some embodiments, LiDAR system 102 may also include a controller (not shown) which controls the operations of transmitting system 1502 and receiving system 1504 respectively.

In some embodiments, light source 1528 may be at least one of a pulsed laser diode, a source of FMCW signal, or AMCW signal, etc. In some embodiments, transmitting aperture 1532 may share aperture with receiving aperture 1534. For example, transmitting aperture 1532 may be a rotatable MEMS mirror array rotatable in a first dimension (e.g., one of a rotatable micro-mirror in a rotatable MEMS mirror array rotatable around axis 1542 as shown in FIG. 15 for both scanning and de-scanning) and receiving aperture 1534 may also be the same rotatable MEMS mirror array. As the aperture size of receiving aperture 1534 may be expended (e.g., increase the number of rotatable micro-mirror in the same rotatable MEMS mirror array), the size of receiving aperture 1534 may ensure a predetermined level of detected signal's signal-to-noise ratio (SNR), the probability of detection (PD), detection distance (the distance between the object to be detected and the LiDAR system), and may reduce the false acceptance rate (incorrectly detect objects that should not be detected) and increase the system's precision (the accuracy of the detect location of the detected object) to a certain level.

In some embodiments, LiDAR system 102 may further include a mechanical system 1543 that rotates in a second dimension, orthodox to the first dimension (e.g., around axis 1556 as shown in FIG. 15) to perform scanning. The rotatable MEMS mirror array may be mounted on mechanical system 1543. For example, mechanical system 1543 may be driven by at least one of a comb drive, a piezoelectric device, or an electromagnetic device. In some embodiments, detector 1536 may be an avalanche photodiode (APD) or a single-photon avalanche diode (SPAD) positioned behind collimator lens 1530.

In some embodiments, the MEMS mirror array shared by transmitting aperture 1532 and receiving aperture 1534 may include one or more rotatable micro-mirrors. FIG. 15 illustrates the MEMS mirror array as having four rotatable micro-mirrors. In some embodiments, the rotatable MEMS mirror array may include a plurality of mirrors that is more than or less than four rotatable micro-mirrors. In one example, the mirror aperture of each of the micro-mirror in the rotatable MEMS mirror array may be a 1 mm×10 mm pulsed laser diode with a +/−3.75° mechanical tilt. In some embodiments, the MEMS mirror array may be rotated at a frequency close to the natural frequency of each of the rotatable micro-mirror in the rotatable MEMS mirror array. For example, for forming a 45° horizontal FOV, the resonant frequency may be set at 5 kHz. For forming a 60° horizontal FOV, the resonant frequency may be set at 6.7 kHz. For forming a 75° horizontal FOV, the resonant frequency may be set at 8 kHz. In some embodiments, the required torque for rotating the mirror may be less than 0.5 u Nm.

In some embodiments, the rotatable MEMS mirror array and the mechanical system 1543 may further both include an actuator (not shown in FIG. 15) to rotate the rotatable mirrors. In some embodiments, the actuators are controlled by controllers that the light beam transmitted from the transmitting system may form a FOV 1552. In some embodiments, the rotatable MEMS mirror array can rotate the each of the rotatable micro-mirror around a first axis 1542 to change a first angle of an output light beam 1518 with respect to scan a first dimension (e.g., the y-axis in FOV 1552). In some embodiments, the rotatable MEMS mirror may be mounted to mechanical system 1543 use screws, adhesives, or another suitable mounting mechanism.

Mechanical system 1543 can rotate around a second axis 1546 to set a second angle with respect to a second dimension (e.g., the x-axis). The controllers can control the actuators to produce different combinations of angles of rotation around first axis 1542 and second axis 1546 such that the movement of output light beam 1518 can follow scanning pattern corresponding to FOV 1562. A range 1564 of movement of output light beam 1518 along the x-axis, as well as a range 1568 of movement of output light beam 1518 along the y-axis, can define a FOV. An object within the FOV, can receive and reflect output light beam 1518 to form a reflected light signal, which can be received by receiving system 1504.

In some embodiments, a collimator lens 1530 that narrows the light beams reflected by receiving aperture 1534 (e.g., more aligned towards detector 1536) may be positioned between receiving aperture 1534 and detector 1536. For example, the distance between collimator lens 1530 and detector 1536 may be determined such that the light beam de-scanned and reflected by receiving aperture 1534 may be focused to the point where detector 1536 is positioned. Because the de-scanned light is now focused to a point comparing to a line where an array of detectors is needed for receiving the de-scanned light, the complexity of alignment is significantly reduced (e.g. the degree of freedom to be aligned is reduced because no freedom of rotation needs to be considered). The reduction in complexity of alignment may result in reduced cost of installation of the LiDAR system.

In some embodiments, detector 1536 may be an avalanche photodiodes (APD) or a single-photon avalanche diode (SPAD). In some embodiments, the receiver of detector 1536 may have a small angle of view (e.g., less than a few centimeters) such that the signal to noise ratio of receiving system 1504 may be increased.

Figure 18:
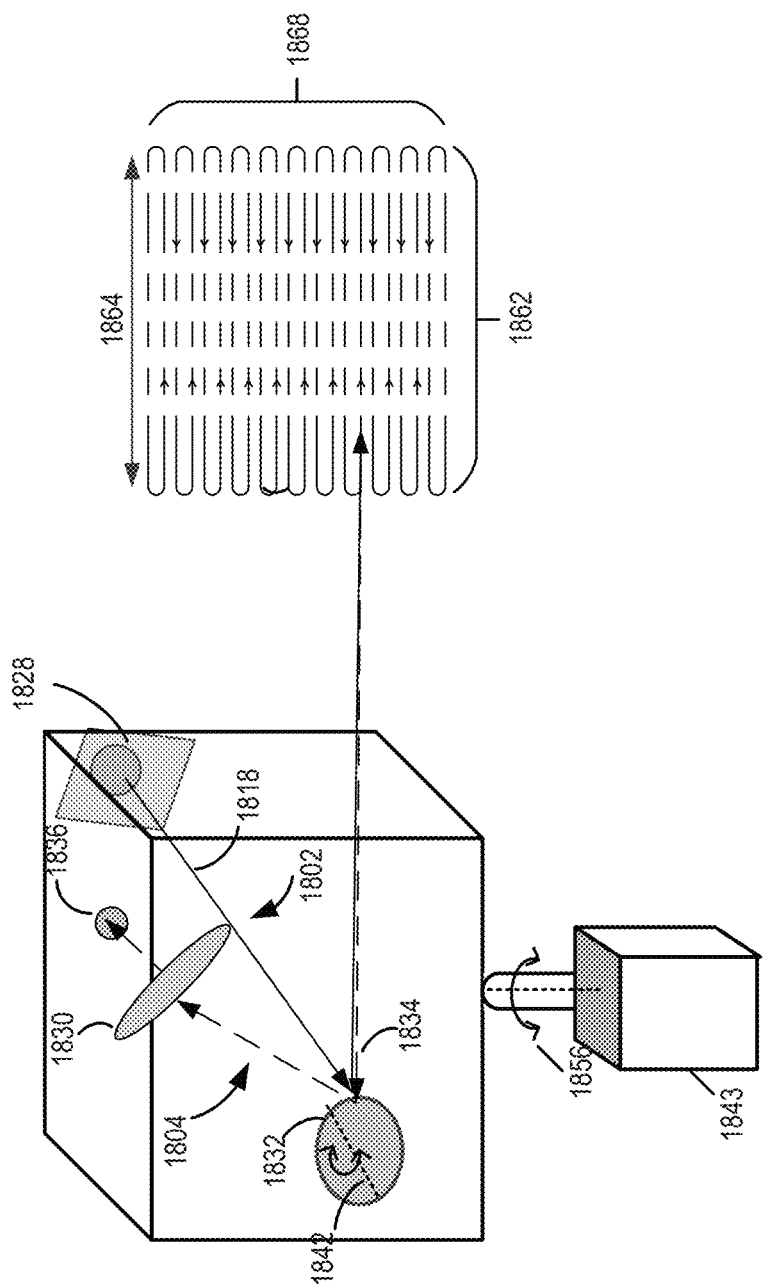
FIG. 18 illustrates another example of a light steering system, according to certain embodiments.

FIG. 18 illustrates examples of internal components of an embodiment of LiDAR system 102, similar to the LiDAR system illustrated in FIG. 18. LiDAR system 102 may include a transmitting system 1802 (a transmitter) and a receiving system 1804 (a detector). In some embodiments, transmitting system 1802 may include a light source 1828, a transmitting aperture 1832, and a mechanical system 1843. Receiving system 1804 may include receiving aperture 1834, detector 1836 and a collimator lens 1830 that narrows the light beams reflected by receiving aperture 1834 (e.g., more aligned towards detector 1836). In some embodiments, LiDAR system 102 may also include a controller (not shown) which controls the operations of transmitting system 1802 and receiving system 1804 respectively. LiDAR system 102 may further include a mechanical system 1843 that rotates in a second dimension, orthodox to the first dimension (e.g., around axis 1856 as shown in FIG. 18) to perform scanning. The rotatable MEMS mirror array may be mounted on mechanical system 1843.

Different from the LiDAR system illustrated in FIG. 15, the aperture shared by transmitting aperture 1832 and receiving aperture 1834 may maybe a single rotatable mirror. For example, transmitting aperture 1832 may be a single rotatable mirror rotatable in a first dimension (e.g., a single rotatable mirror driven by a MEMS system, rotatable around axis 1842 as shown in FIG. 18 for both scanning and de-scanning) and receiving aperture 1834 may also be the same single rotatable MEMS mirror (i.e., using the same rotatable mirror as both transmitting aperture 1832 and receiving aperture 1834). The other internal components may be the same or similar to the counterpart components in the LiDAR system illustrated in FIG. 15. For ease of illustration, same or similar components illustrated in FIG. 15 are not repeated in the description.

Figure 16:
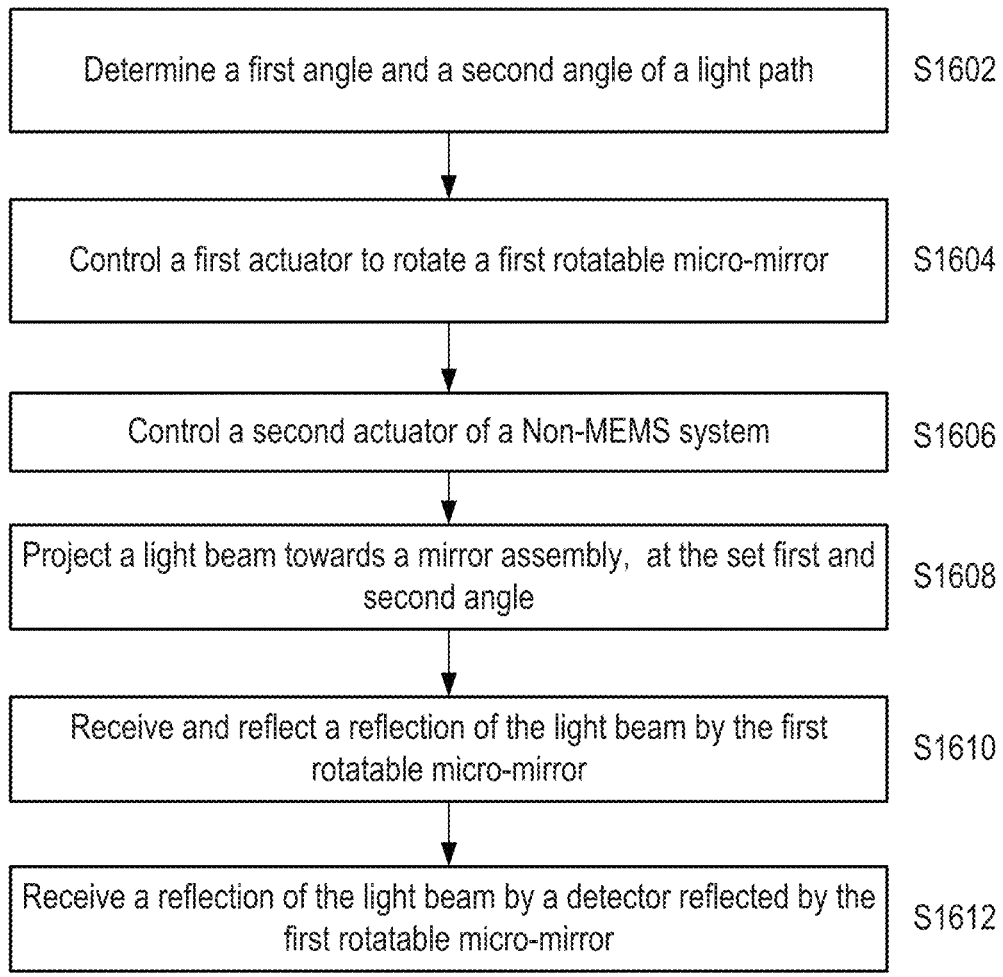
FIG. 16 illustrates a flowchart of method of operating a mirror assembly, according to embodiments of the disclosure.

FIG. 16 illustrates a flowchart of a method of operating a mirror assembly, according to embodiments of the disclosure. FIG. 16 shows a simplified flow diagram of method 1600 for performing light steering operation using a LiDAR system 102, such as LiDAR systems shown in FIG. 14, FIG. 15, FIG. 17 and FIG. 18.

At operation 1602, a controller determines a first angle and a second angle of a light path. In some embodiments, the light path may be one of the projection paths for output light or an input path of input light, the first angle may be with respect to a first dimension and the second angle may be with respect to a second dimension orthogonal to the first dimension. The first angle may be set according to a scanning pattern (e.g., a sinusoidal scanning trajectory along the fast axis). The second angle may be set according to the scanning pattern (e.g., sawtooth scanning trajectory or a triangle scanning trajectory along the slow axis).

At operation 1604, the controller controls a first actuator to rotate a first rotatable mirror of the MEMS to set the first angle. The controller may also control the first actuator to exert a torque to the first rotatable mirror as a quasi-static load.

At operation 1606, the controller controls a non-MEMS system to set the second angle. In some embodiments, the controller may control the second actuator to exert a torque to a second rotatable mirror using a non-MEMS system (e.g., a galvanometer mirror or a polygon mirror). In some other embodiments, the controller may change the mirror within a flash system (e.g., an array of identical mirrors) to move the light beam within the scanning pattern. In some embodiments, the controller may control the second actuator to exert a torque to the second rotatable mirror using a MEMS, similar to control the first rotatable mirror of the MEMS to set the first angle. In some embodiments, the controller may control a motor where the MEMS system is mounted to set the second angle.

At operation 1608, the controller uses the first rotatable mirror set at the first angle and the second actuator to set at the second angle to perform at least one of: reflecting the output light from the light source along the projection path towards an object or reflecting the input light propagating along the input path to a receiver. For example, the controller may control a light source to project a light beam including a light signal towards the mirror assembly. The light source may include a pulsed laser diode, a source of FMCW signal, a source of AMCW signal, etc.

At operation 1610, the controller controls the first rotatable micro-mirror to receive and reflect a reflection of the light beam. For example, the MEMS system and the non-MEMS system may be aligned that the light beam reflected by the object can be received by the first rotatable micro-mirror.

At operation 1612, the detector may receive a reflection of the light beam, reflected by a distant object, from the first rotatable micro-mirror. For example, an object within a FOV may be detected by reflecting the light beam back to the detector, and the detector is aligned with MEMS system such that the reflected light beam may be focused by a collimator lens at the point where the detector is positioned.

Any of the methods described herein may be totally or partially performed with a computer system including one or more processors, which may be configured to perform the steps. Thus, embodiments may be directed to computer systems configured to perform the steps of any of the methods described herein, potentially with different components performing a respective step or a respective group of steps. Although presented as numbered steps, steps of methods herein may be performed at a same time or in a different order. Additionally, portions of these steps may be used with portions of other steps from other methods. Also, all or portions of a step may be optional. Additionally, any of the steps of any of the methods may be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A Light Detection and Ranging (LiDAR) system comprising:
   a light source configured to emit a light beam;
   a single rotatable mirror configured to set a first angle of a light path of the light beam with respect to a first dimension;
   a micro-mirror array comprising a plurality of individually rotatable micro-mirrors, configured to each rotate by a same angle to collectively set a second angle of the light path of the light beam with respect to a second dimension, orthogonal to the first dimension;
   a substrate comprising the single rotatable mirror and the micro-mirror array, a collective surface area of the plurality of individually rotatable micro-mirrors being equal to a surface area of the single rotatable mirror such that the micro-mirror array provides the same dispersion angle as the single rotatable mirror; and
   a detector,
     wherein the single rotatable mirror and the micro-mirror array are configured to steer the light beam received from the light source towards an object, and are further configured to steer the light beam reflected by the object to the detector.

2. The LiDAR system of claim 1, wherein the micro-mirror array comprises a plurality of micro-electromechanical system (MEMS) mirrors.

3. The LiDAR system of claim 2, wherein the single rotatable mirror comprises a mechanical scanner.

4. The LiDAR system of claim 3, wherein each of the MEMS mirrors is driven by at least one of a comb drive, a piezoelectric device, or an electromagnetic device.

5. The LiDAR system of claim 2, wherein the single rotatable mirror comprises at least one of a galvanometer scanner, a polygon scanner, or a flash configured to diverge the light beam.

6. The LiDAR system of claim 2, wherein the detector comprises at least one of an avalanche photodiode (APD) or a single-photon avalanche diode (SPAD).

7. The LiDAR system of claim 2, wherein the single rotatable mirror is configured to rotate at a first frequency; and
wherein each MEMS mirror of the micro-mirror array is configured to rotate at a second frequency higher than the first frequency.

8. The LiDAR system of claim 7, wherein a mass of each MEMS mirror of the micro-mirror array is smaller than a mass of the single rotatable mirror.

9. The LiDAR system of claim 1, wherein the detector is further configured to determine a location of the object with respect to the LiDAR system based on the light beam emitted by the light source, the light beam received by the detector, the first angle, and the second angle.

10. The LiDAR system of claim 1, further comprising:
a collimator lens configured to collimate the light beam from the light source, wherein the micro-mirror array and the single rotatable mirror are configured to reflect the collimated light beam,
wherein each of the single rotatable mirror and the micro-mirror array has a dimension that matches an aperture length of the collimator lens.

11. A method for adjusting a light beam in a full-coaxial architecture light steering system, comprising:
emitting, by an emitter, a light beam;
determining, by a single rotatable mirror formed on a substrate, a first angle of a light path of the light beam with respect to a first dimension;
determining, by a micro-mirror array comprising a plurality of individually rotatable micro-mirrors formed on the substrate, a second angle of the light path of the light beam with respect to a second dimension orthogonal to the first dimension, wherein each rotatable micro-mirror in the micro-mirror array is rotated to a same angle to collectively set the second angle of the light path and wherein a collective surface area of the plurality of individually rotatable micro-mirrors is equal to a surface area of the single rotatable mirror such that the micro-mirror array provides the same dispersion angle as the single rotatable mirror; and
steering, by the single rotatable mirror and the micro-mirror array, the light beam reflected by an object to a detector.

12. The method of claim 11, wherein the micro-mirror array comprises a plurality of MEMS mirrors.

13. The method of claim 12, wherein the single rotatable mirror comprises a mechanical scanner.

14. The method of claim 12, wherein the single rotatable mirror comprises at least one of a galvanometer scanner, a polygon scanner or a flash configured to diverge the light beam.

15. The method of claim 12, wherein the detector comprises at least one of an avalanche photodiode (APD) or a single-photon avalanche diode (SPAD).

16. The method of claim 12, further comprising:
rotating, the single rotatable mirror at a first frequency; and
rotating each MEMS mirror of the micro-mirror array at a second frequency higher than the first frequency.

17. The method of claim 12, further comprising:
collimating, by a collimator lens, the light beam emitted by the emitter; and
reflecting the collimated light beam by the micro-mirror and the single rotatable mirror,
wherein each of the single rotatable mirror and the micro-mirror array has a dimension that matches an aperture length of the collimator lens.

18. The method of claim 11, further comprising: determining a location of the object with respect to the full-coaxial architecture light steering system, by the detector, based on the light beam emitted by the emitter, the light beam reflected by the detector, the first angle, and the second angle.

19. A Light Detection and Ranging (LiDAR) device, comprising:
an emitter configured to emit a light beam;
a single rotatable mirror configured to set a first angle of a light path of the light beam with respect to a first dimension;
a micro-electromechanical system (MEMS) mirror array comprising a plurality of individually rotatable MEMS mirrors, configured to each rotate by a same angle to collectively set a second angle of the light path of the light beam with respect to a second dimension, orthogonal to the first dimension;
a substrate comprising the single rotatable mirror and the MEMS mirror array, a collective surface area of the plurality of individually rotatable MEMS mirrors being equal to a surface area of the single rotatable mirror such that the MEMS mirror array provides the same dispersion angle as the single rotatable mirror; and
a detector,
wherein the single rotatable mirror and the MEMS mirror array are configured to steer the light beam received from the emitter towards an object, and are further configured to steer the light beam reflected by the object to the detector.

20. The LiDAR device of claim 19, wherein the single rotatable mirror comprises at least one of a mechanical scanner, a galvanometer scanner, a polygon scanner or a flash configured to diverge the light beam.

21. The LiDAR device of claim 19, wherein the single rotatable mirror is configured to rotate at a first frequency; and
wherein each MEMS mirror of the MEMS mirror array is configured to rotate at a second frequency higher than the first frequency.

22. The LiDAR device of claim 19, wherein the detector is further configured to determine a location of the object with respect to the LiDAR device based on the light beam emitted by the emitter, the light beam received by the detector, the first angle, and the second angle.

23. The LiDAR device of claim 19, further comprising:
a collimator lens configured to collimate the light beam from the emitter, wherein the MEMS mirror array and the single rotatable mirror are configured to reflect the collimated light beam,
wherein each of the single rotatable mirror and the MEMS mirror array has a dimension that matches an aperture length of the collimator lens.

* * * * *